Jan. 19, 1943.                H. A. PERKINS                 2,308,537
 METHOD OF AND APPARATUS FOR THE MANUFACTURE OF ROD-LIKE ARTICLES
         Filed Oct. 3, 1939            14 Sheets-Sheet 9
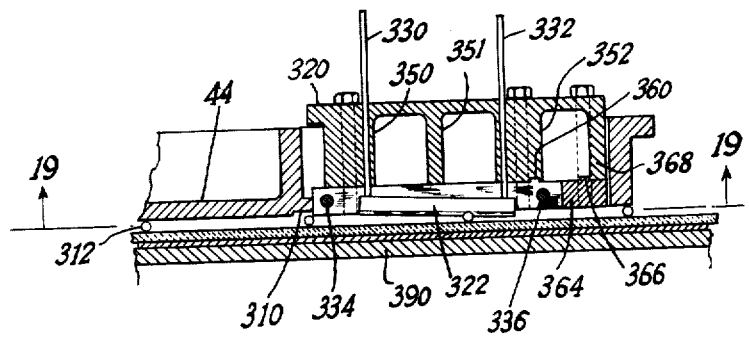
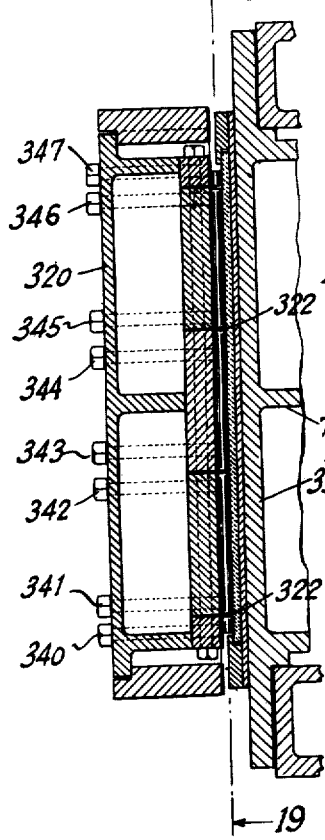
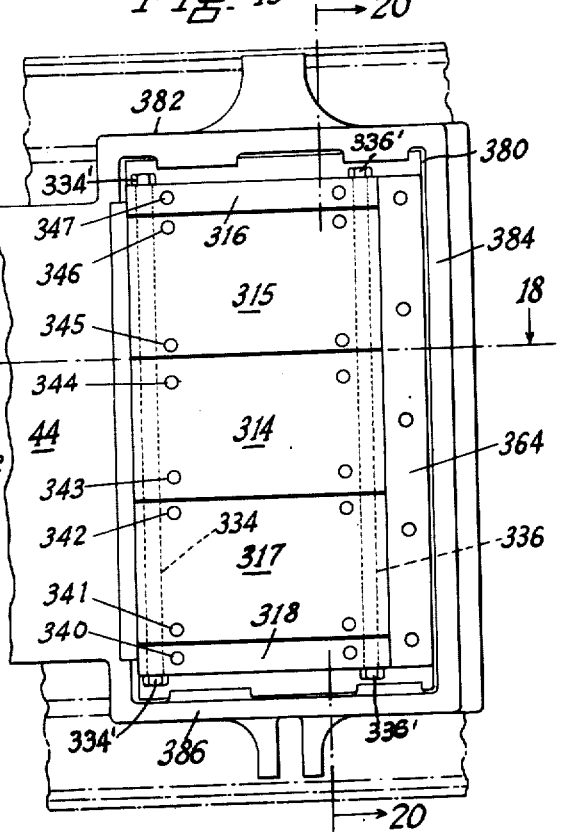
INVENTOR.
Hiram A. Perkins
BY
*R. M. Holbrook*
ATTORNEY.

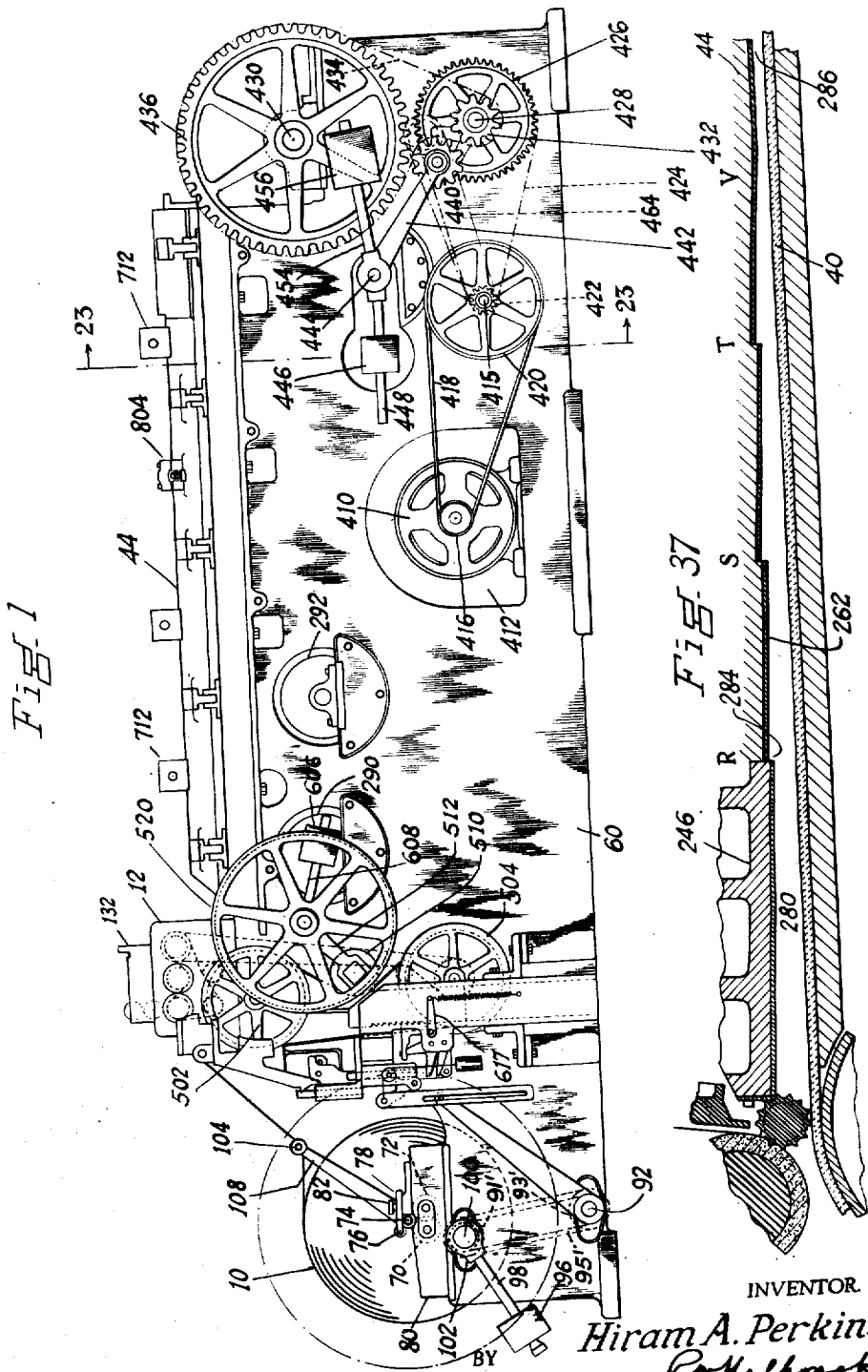

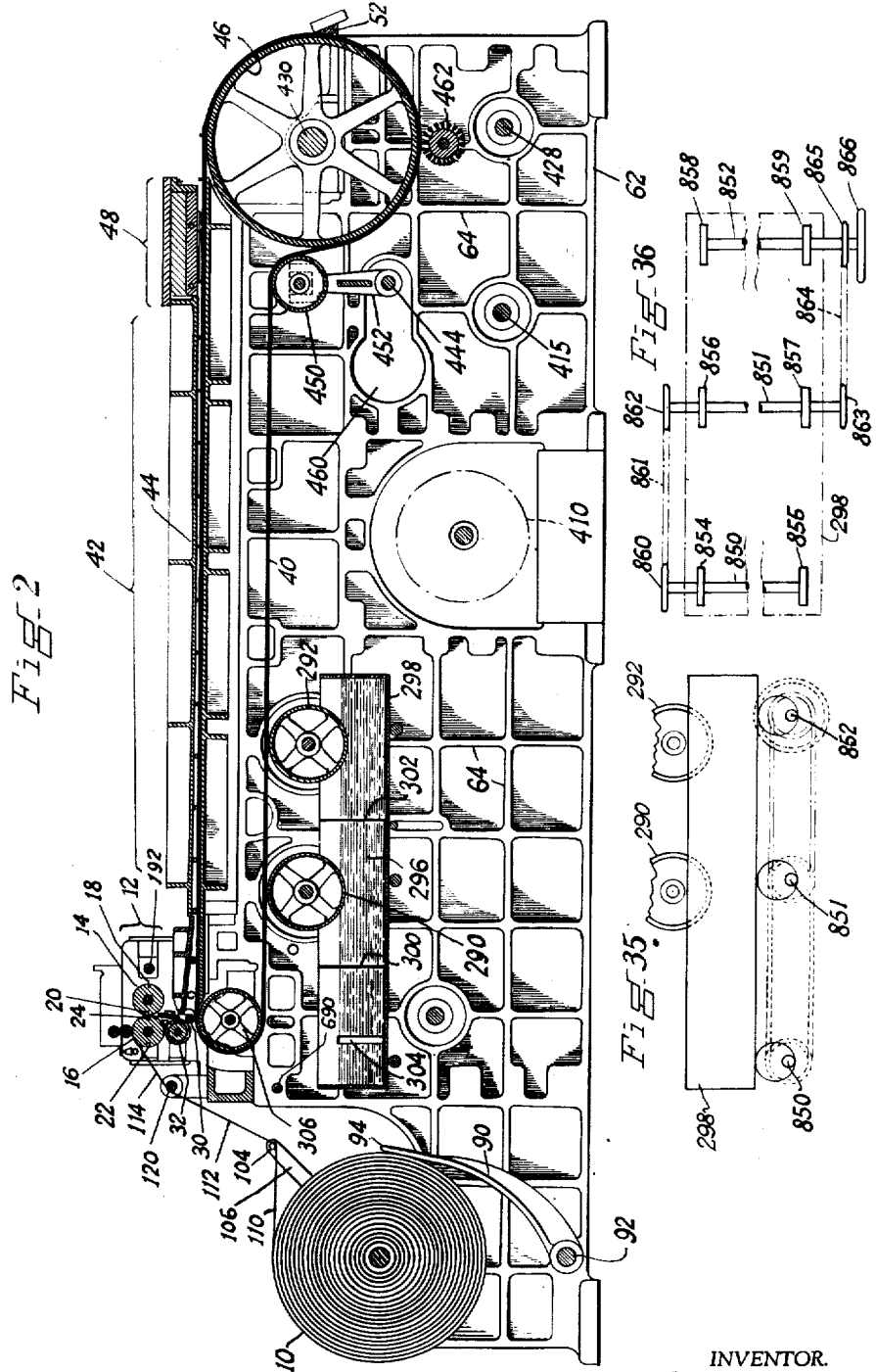

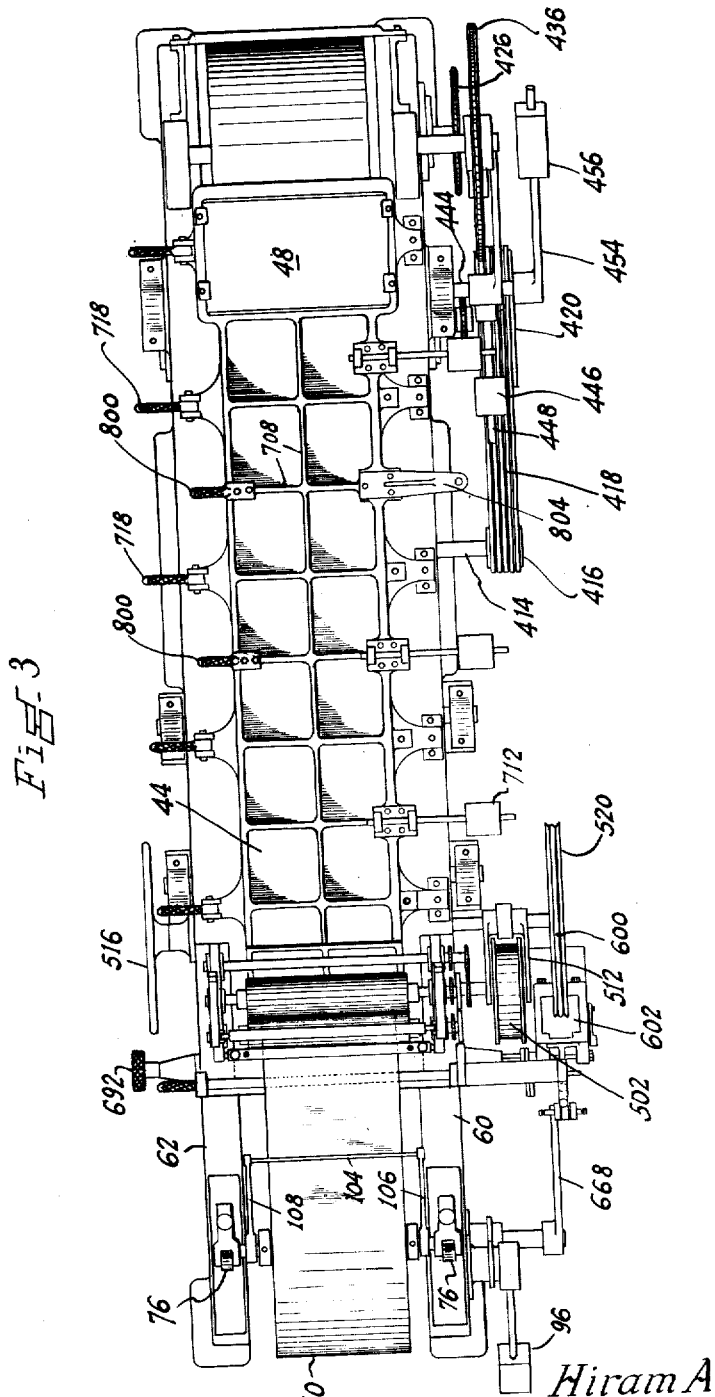

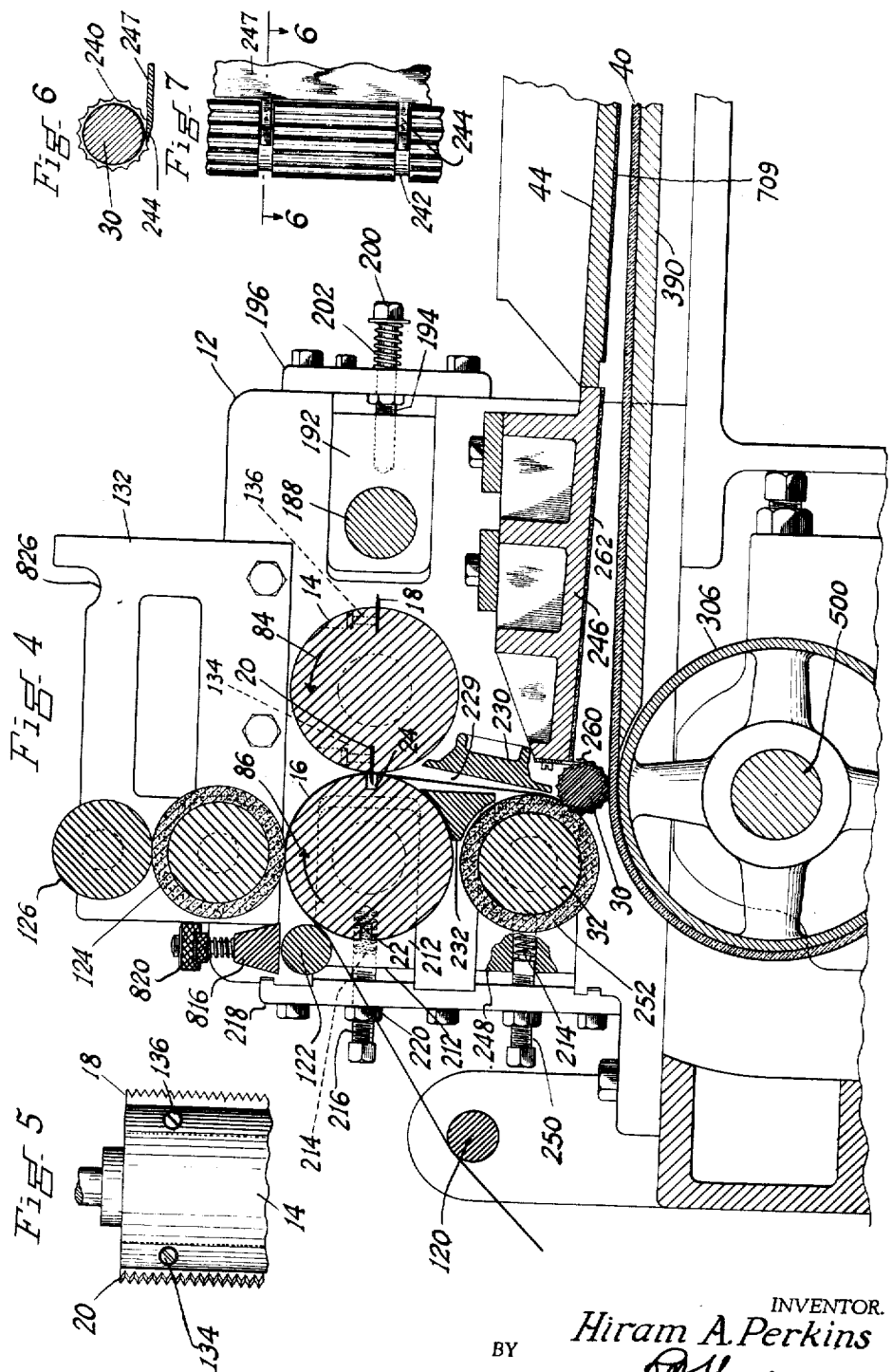

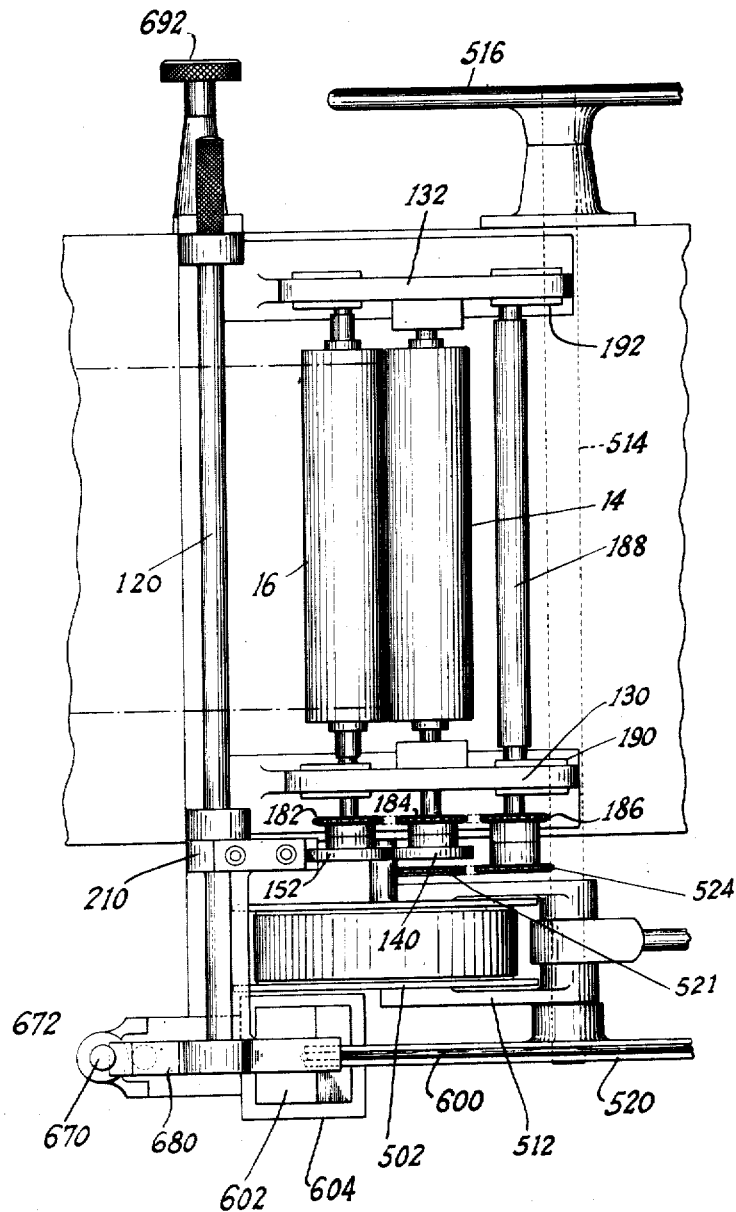

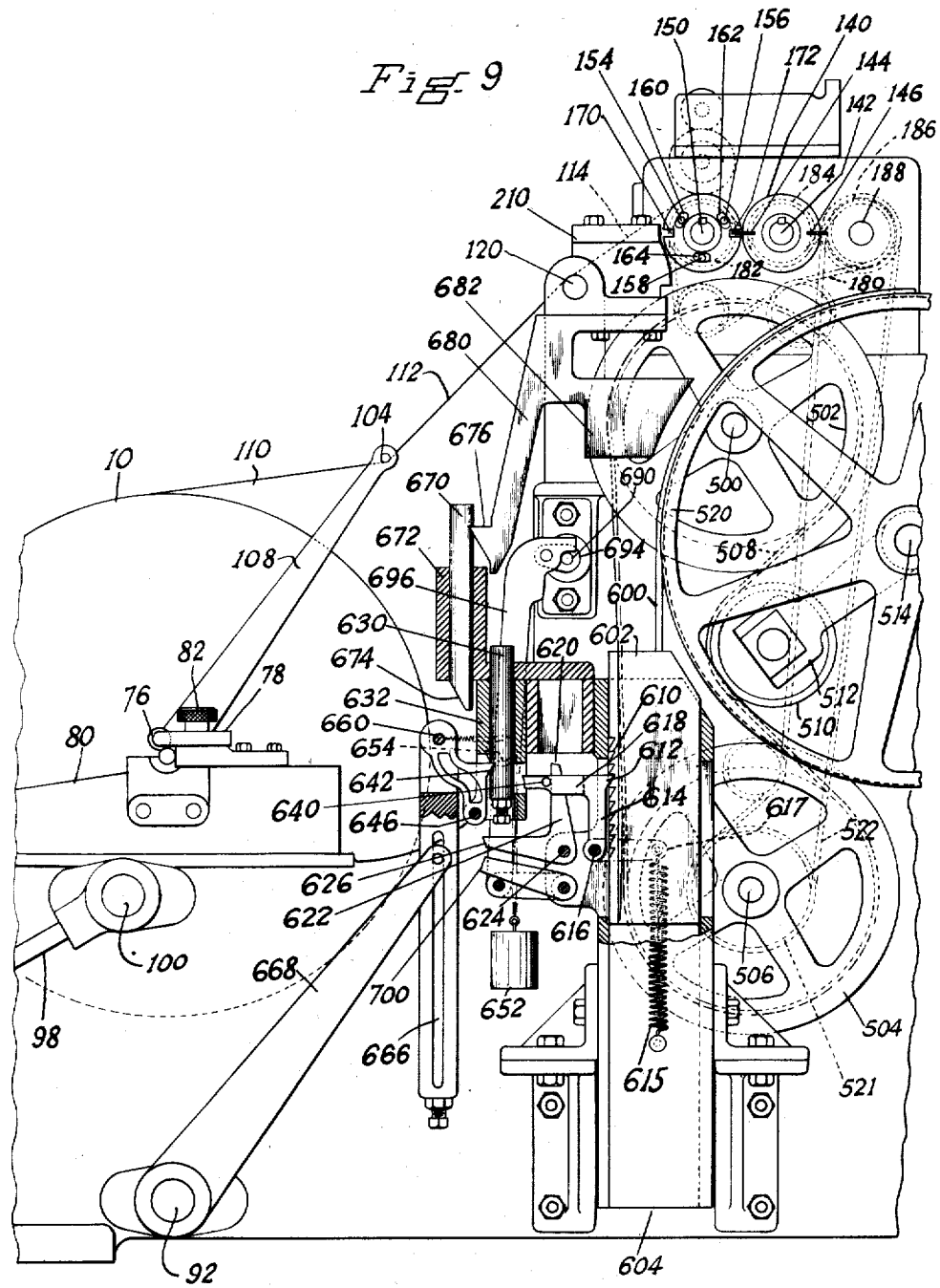

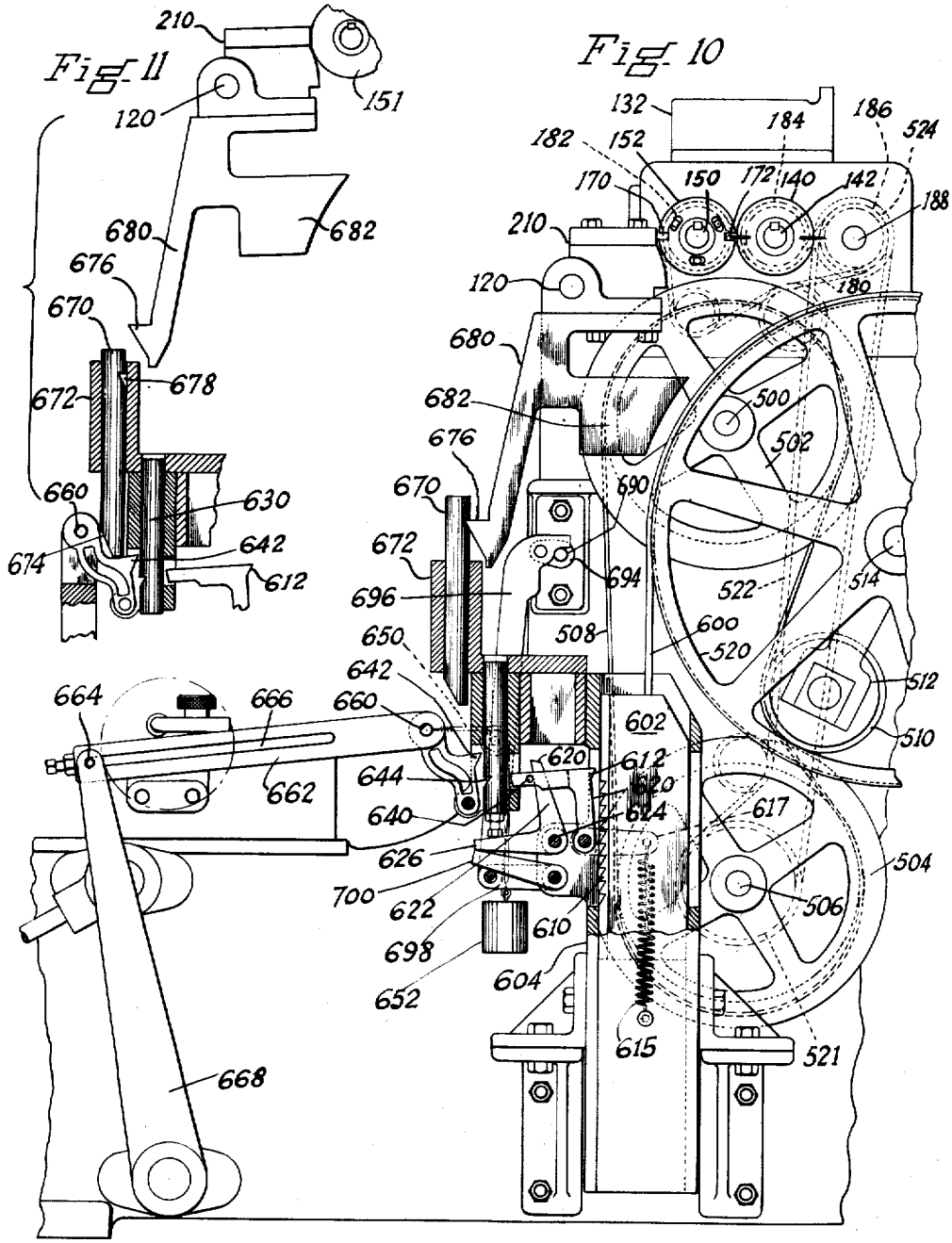

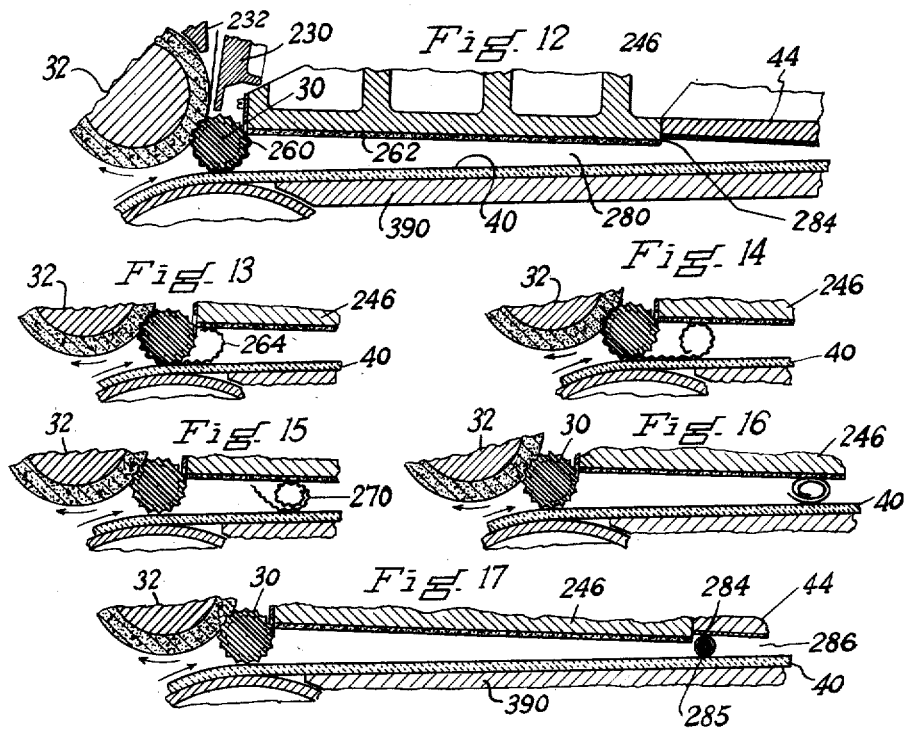
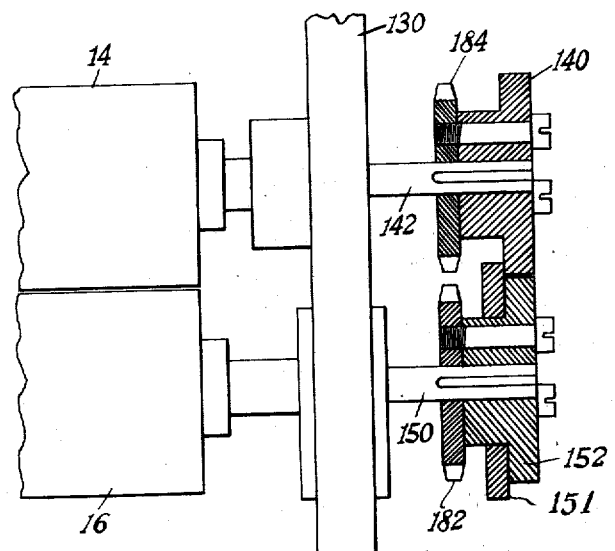
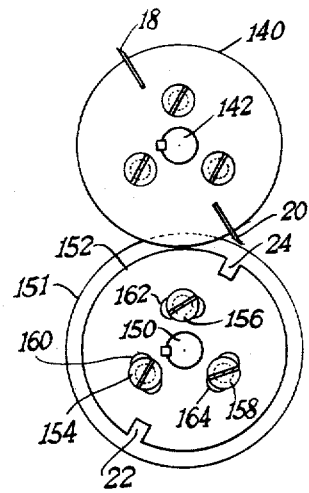

Jan. 19, 1943.  H. A. PERKINS  2,308,537
METHOD OF AND APPARATUS FOR THE MANUFACTURE OF ROD-LIKE ARTICLES
Filed Oct. 3, 1939  14 Sheets-Sheet 10
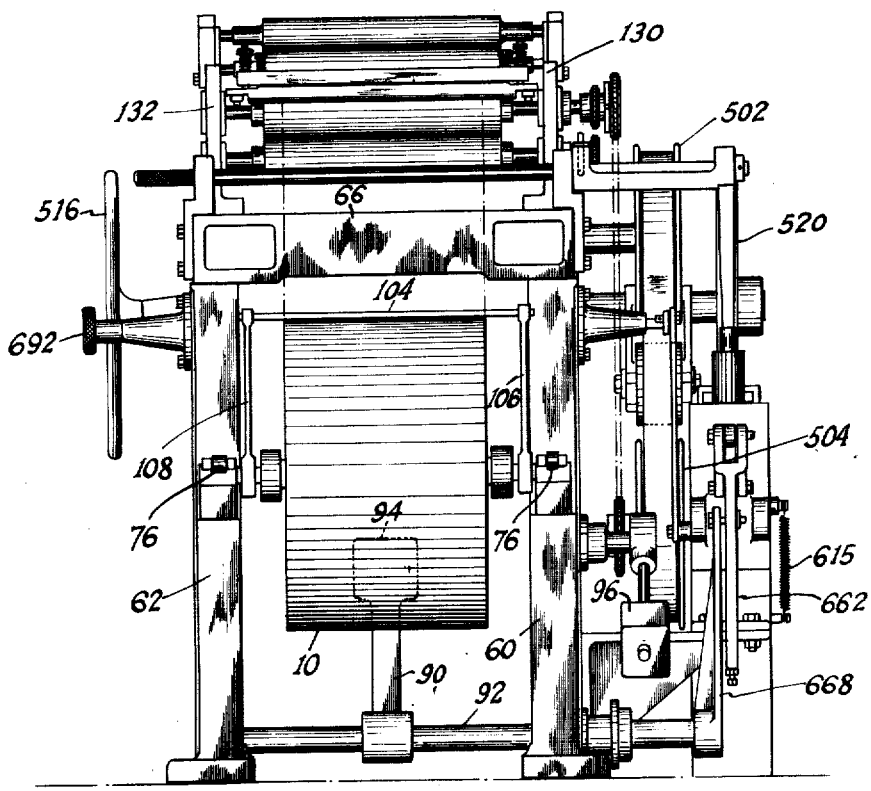
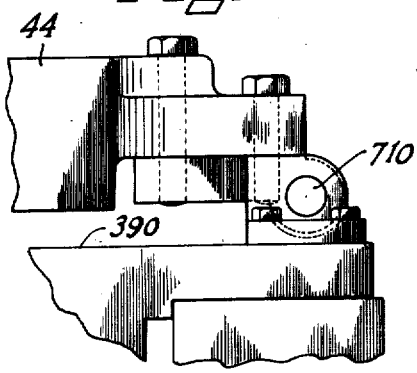
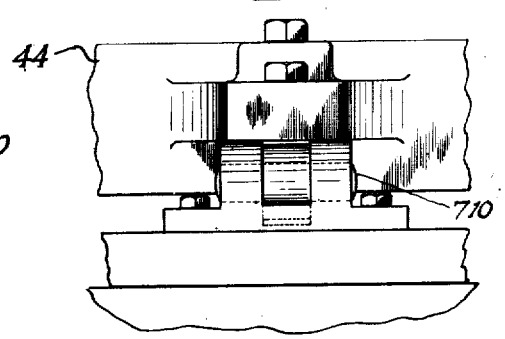
INVENTOR.
Hiram A. Perkins
BY
ATTORNEY.

Jan. 19, 1943.   H. A. PERKINS   2,308,537
METHOD OF AND APPARATUS FOR THE MANUFACTURE OF ROD-LIKE ARTICLES
Filed Oct. 3, 1939   14 Sheets-Sheet 11
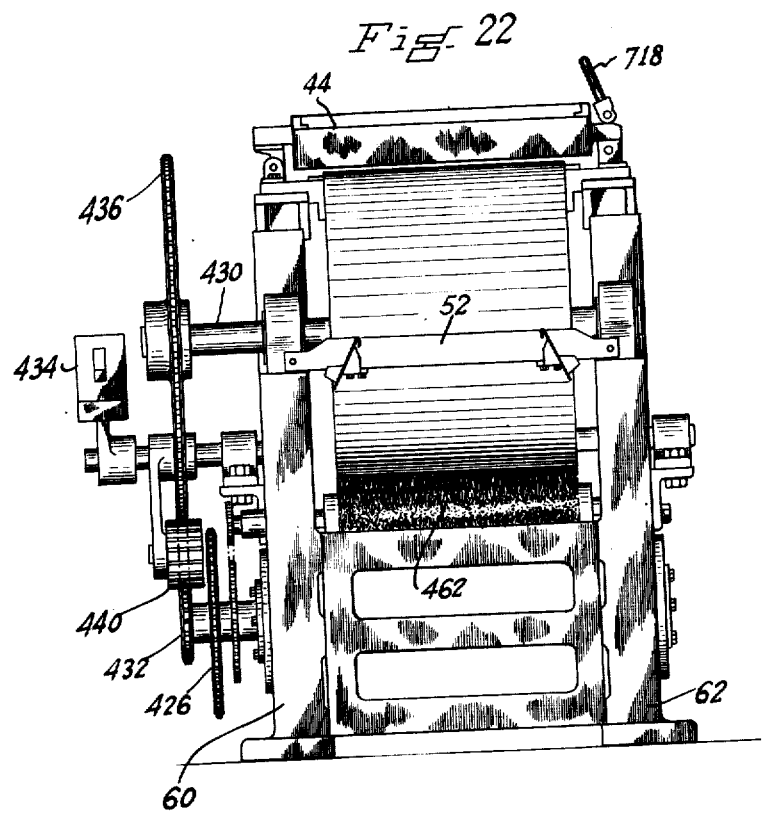
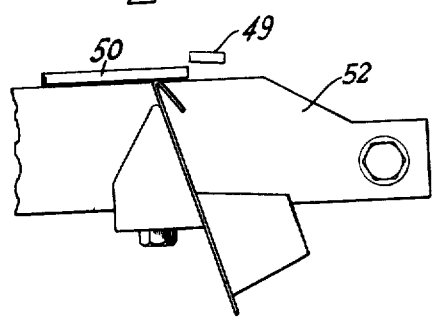
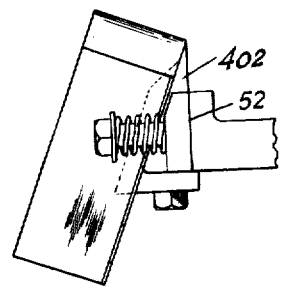
INVENTOR.
Hiram A. Perkins
BY
ATTORNEY.

Jan. 19, 1943.    H. A. PERKINS    2,308,537
METHOD OF AND APPARATUS FOR THE MANUFACTURE OF ROD-LIKE ARTICLES
Filed Oct. 3, 1939    14 Sheets-Sheet 12
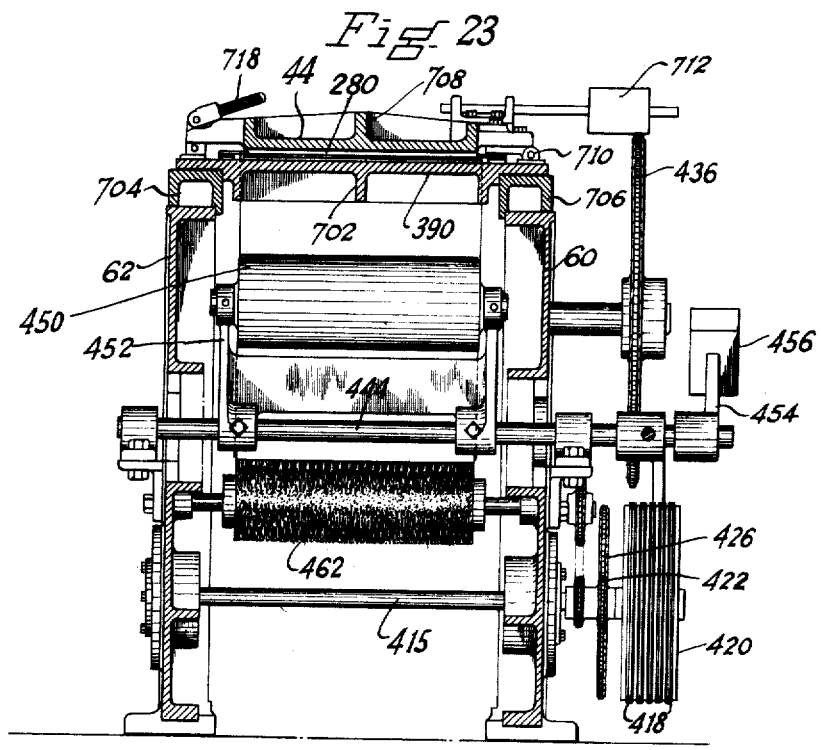
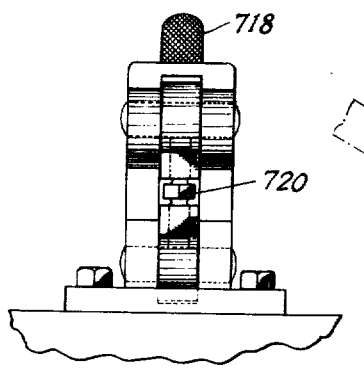
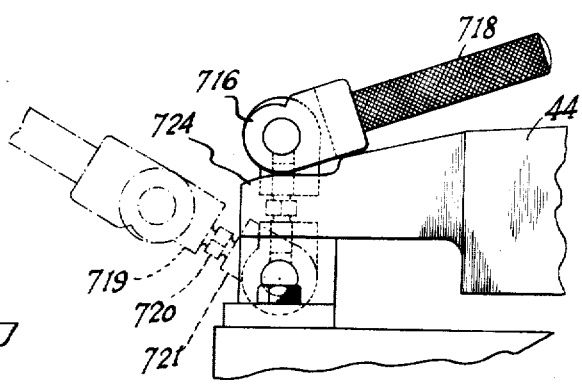
INVENTOR.
Hiram A. Perkins
BY
ATTORNEY.

Jan. 19, 1943.  H. A. PERKINS  2,308,537
METHOD OF AND APPARATUS FOR THE MANUFACTURE OF ROD-LIKE ARTICLES
Filed Oct. 3, 1939  14 Sheets-Sheet 13
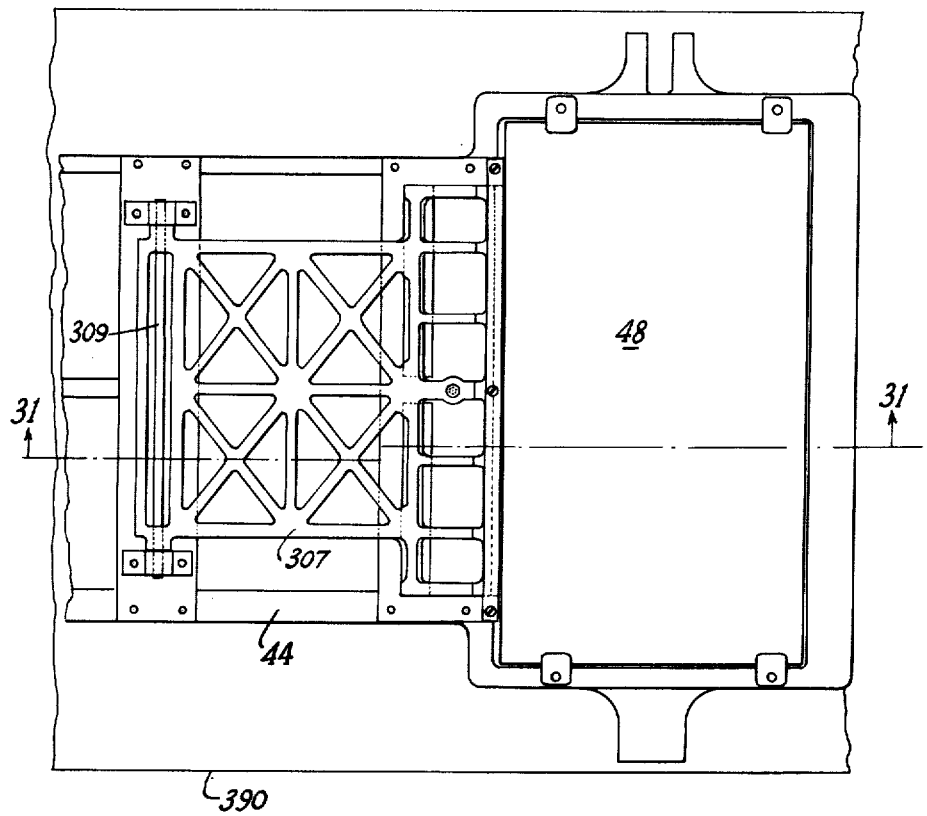
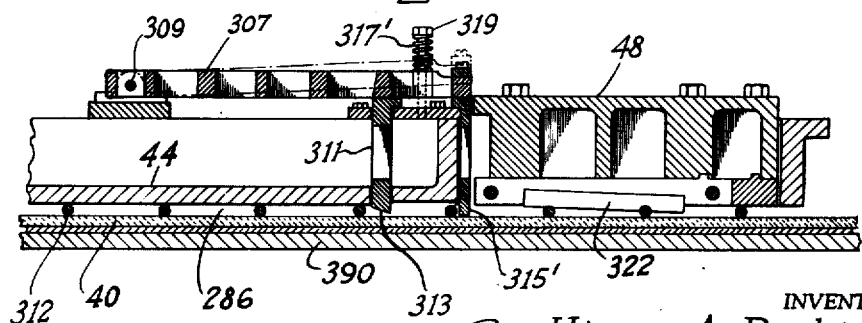
INVENTOR.
Hiram A. Perkins
BY
ATTORNEY.

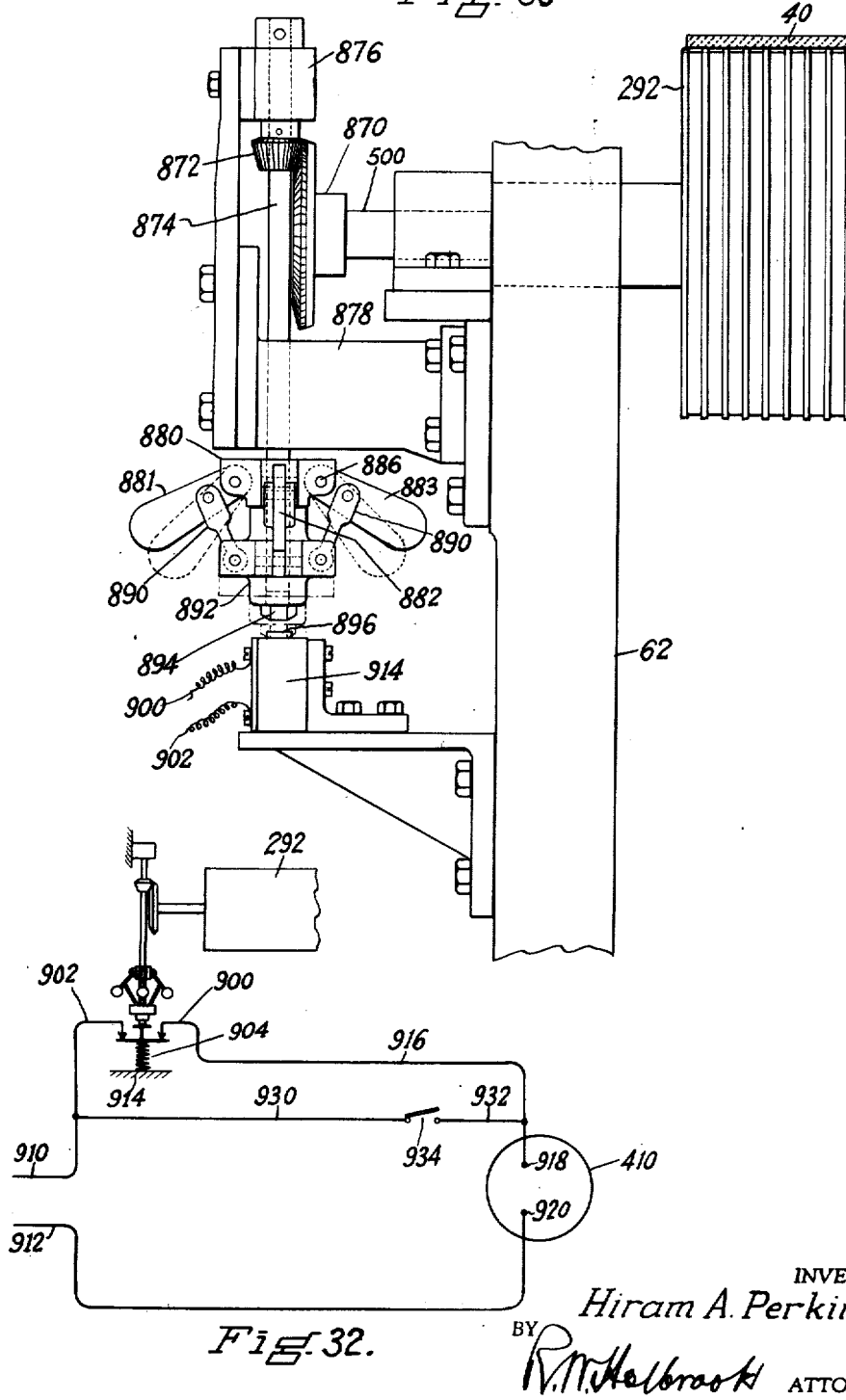

Patented Jan. 19, 1943

2,308,537

UNITED STATES PATENT OFFICE 2,308,537

METHOD OF AND APPARATUS FOR THE MANUFACTURE OF RODLIKE ARTICLES

Hiram A. Perkins, Rochester, N. Y., assignor to Setter Bros. Inc., Cattaraugus, N. Y., a corporation of New York Application October 3, 1939, Serial No. 297,684

23 Claims. (Cl. 93—1)

This invention relates to confection supporting sticks and similar articles, methods of manufacturing them, and apparatus for effecting such methods. It is particularly concerned with the manufacture of such articles from paper or other sheet material, by rolling up strips of such material on themselves to form rigid self-sustaining bodies.

An object of the invention is to provide improved apparatus whereby tightly rolled and rodlike paper sticks may be rapidly and automatically formed in a reliable manner. The stick produced is preferably substantially solid to promote its advantageous employment in the manufacture of confection products, the use of which will eliminate certain hazards of the prior art.

Other objects of the invention will appear in the following description in which illustrative embodiments of the invention are described in accordance with the requirements of the Federal statutes pertaining to such matters, and particularly section 4888 R. S.

The apparatus illustrated in the accompanying drawings receives paper unwound from a supply roll at a substantially constant speed; it cuts the paper into strips; subjects the strips to a multiple crimping action along closely spaced parallel lines to initiate their convolution; it continues the convoluting action to form loose rolls; and it compacts and bonds the loosely convoluted rolls into substantially solid and self-sustaining rodlike bodies.

In the accompanying drawings:

Fig. 1 is a side elevation of the illustrative apparatus.

Fig. 2 is a longitudinal vertical section through the machine shown in Fig. 1.

Fig. 3 is a plan of the machine.

Fig. 4 is a vertical section through the roll stand, illustrating the operation of the means for cutting the paper into strips and the means for crimping the strips.

Fig. 5 is a detail view in the nature of a partial plan of the cutter indicated in Fig. 4.

Fig. 6 is a detail view illustrating, in vertical section, the crimper roll and the strippers which separate the crimped paper strips from the roll. This view is taken on the line 6—6 of Fig. 7.

Fig. 7 is a view in the nature of a partial elevation of the crimper roll and stripper shown in Fig. 6.

Fig. 8 is a plan view of the forward part of the illustrative machine showing the roll stand and the elements associated therewith.

Fig. 9 is a large scale partial elevation showing the control mechanism, some parts of which are indicated in vertical section.

Fig. 10 is a view similar to Fig. 9 showing parts of the control mechanism in their positions assumed when the operation of the machine is stopped due to exhaustion of the paper supply.

Fig. 11 is a detail view showing the mechanism for stopping the operation of the machine in the event that the cutter or crimper fails to function properly.

Figs. 12 to 17 inclusive are vertical sections diagrammatically showing successive actions of the crimper and its co-acting parts in initiating the formation of a loosely convoluted paper roll.

Fig. 18 is a vertical section through the stick cutter which severs the compacted sticks into desired lengths for candy sticks. This view is taken on the section line 18—18 of Fig. 19, looking in the direction of the arrows.

Fig. 19 is a bottom plan of the stick cutter, taken on the plane indicated by the line 19—19 of Figs. 18 and 20 and looking in the direction of the arrows.

Fig. 20 is a vertical longitudinal section through the stick cutter taken on the section line 20—20 of Fig. 19. This view shows the compacted stick cut into three lengths appropriate for use in the manufacture of confection products.

Fig. 21 is a front elevation of the machine.

Fig. 22 is a rear elevation of the machine.

Fig. 23 is a vertical section on the broken section line 23—23 of Fig. 1.

Fig. 24 is a detail view showing one of the devices for separating the selvage ends of the cut sticks from the stick portions of the proper length for commercial use. This view shows this device in front elevation.

Fig. 25 is a side elevation of the device shown in Fig. 24.

Fig. 26 is an enlarged detailed view of the cam lock by which the hinged presser plate is locked in its operative position.

Fig. 27 is a detail view showing the Fig. 26 cam lock in end elevation.

Fig. 28 is a detailed view showing part of the hinge structure for the presser plate.

Fig. 29 is an end elevation of the hinged construction shown in Fig. 28.

Fig. 30 is a partial plan showing the stick straightening and squaring device.

Fig. 31 is a longitudinal vertical section on the plane of the line 31—31 of Fig. 30.

Fig. 32 is a diagrammatic view indicating the Fig. 33 control mechanism and the manner in which it is associated with the electrical circuits for controlling the driving motor.

Fig. 33 is a partial plan view showing the "tell-tale" discs and their associated elements, in horizontal section.

Fig. 34 is an elevation of the "tell-tale" discs.

Fig. 35 is a diagrammatic view in the nature of a side elevation showing a mechanism for controlling the supply of bonding fluid.

Fig. 36 is a diagrammatic view in the nature of a plan showing arrangement of elements for the Fig. 35 mechanism.

Fig. 37 is a partial vertical section illustrating the construction of the pressure plate structure for providing a succession of convoluting and compacting actions between which the loosely convoluted rolls are permitted to expand so that they assume a more nearly circular cross-section.

Fig. 38 is a detail view in the nature of an elevation showing a part of the control mechanism by which the movement of the main belt is stopped when its speed falls below a predetermined speed.

Referring generally to the operation of the machine, the paper runs continuously through the machine from the rotatable supply roll 10 (see Fig. 2). It first moves to the roll stand 12 where it passes between the cutter roll 14 and the co-acting presser roll 16. The former carries diametrically opposed knives 18 and 20 which enter similarly positioned recesses 22 and 24 in the presser roll 16 as these rolls rotate. The paper is thus cut into the desired lengths.

The severed strips of paper then are advanced to a position wherein they are, in succession, forced against the crimper roll 30 by the rubber faced roll 32. As the roll 32 is driven, each paper strip is crimped and advanced partially about an arc of the crimper roll. As the crimped portion approaches the end of this arc it is separated from the crimper roll and the separated portion begins to form convolutions the number of which is increased by the subsequent advance of the strip and by the action of elements associated with the crimper roll. This formation of convolutions is then continued by the action of the endless belt 40 which is continuously driven so that its upper run moves to the right in Figs. 2, 4, and 12 to 17 inclusive. The formation of the loosely convoluted rolls takes place in different stages such as those indicated in Figs. 12 to 17, and the belt 40 then causes the rolls to advance through the compacter which is generally indicated by the numeral 42 in Fig. 2. The upper surface of the belt forms the lower side of the roll compacting passage-way and the upper side of that passageway is formed by the bottom surface of the presser plate structure 44. A part of this passage-way preferably tapers toward a smaller cross-section in the direction of movement of the belt 40, and there may be a succession of such tapering sections to properly perfect the shape of the ultimate product. However, as the paper rolls must be set and bonded as well as reduced in diameter and compacted, I have found that a later or final section of the passage-way should not thus taper, but should have its sides substantially parallel in order that the reduced rolls may be adequately bonded and given a permanent set.

The belt 40 is driven by a pulley 46 so that it causes the compacted sticks to advance beneath the stick cutter mechanism 48. In such advance the compacted sticks are cut into the desired lengths as indicated in Fig. 18. The cut sticks then move over a part of the surface of the belt on the pulley 46 and are removed from the belt, the selvage ends 49 (Fig. 24) of the sticks being separated from the sticks 50 of proper lengths by the device indicated in Fig. 24 of the drawings. This device is mounted upon a wiper bar 52 which is held in position closely adjacent to the surface of the belt at the discharge end of the machine.

The frame of the machine itself which is shown in side elevation in Fig. 1 and in plan in Fig. 3, consists of two heavy side castings 60 and 62. Each is reinforced interiorly of the machine by the ribs 64. The castings are held in parallel relationship by appropriate transverse frame members, one of which is indicated at 66 in Fig. 21.

At the forward end of the machine bearings are provided for rotatably supporting the ends of the shaft upon which the rotatable paper supply roll 10 is mounted. Each of these bearings consists of a plurality of interspersed or overlapping rollers such as are indicated at 70 and 72 in Fig. 1. At each side of the machine the shaft 74, non-rotatably mounted in the core of the paper supply roll 10 rests between and upon these rollers and it is held in position on the rollers by a co-operating roller 76 rotatably mounted in the end of a block 78 which is releasably secured to a support 80 resting upon the forward end of the frame. This arrangement of elements (Fig. 1) is such that the shaft for the paper supply roll may be readily removed when a roll is exhausted and a new supply roll quickly placed in operative position. Thereupon the block 78 is locked in its operative position by the cap screw 82 so as to hold the roller 72 in contact with the shaft 74.

In order that the paper may remain under tension between the supply roll 10 and the roll stand 12, means are provided for preventing overrunning of the supply roll. As illustrated, this means includes a presser arm 90 illustrated in Fig. 2. This arm is fixed upon a rod 92 journalled in the side frame members 60 and 62 as particularly indicated in Fig. 21. At its upper end the arm 90 carries a smooth faced presser foot 94 which is held frictionally against the supply roll by reason of the action of the weight 96 (Fig. 1) slidably mounted upon an arm 98 which is non-rotatably fixed upon a trunnion 100.

The trunnion 100 is journalled in a bearing 102 in the frame member 60 and has fixed at its other end a sprocket 91'. An aligned sprocket 93' is secured to the rod 92 and a sprocket chain 95' is trained over these sprockets. This arrangement of elements causes the trunnion 100 and the rod 92 to turn in unison and renders the weight 96 effective to continuously bias the presser foot 94 against the supply roll 10 so as to prevent its over-running.

When, after the exhaustion of the paper of one supply roll, it is desired to insert a new supply roll, the presser arm must be released so as not to interfere with the installation of the new roll. This is readily accomplished by sliding the weight 96 along the rod or arm 98 toward the trunnion 100. As it approaches that position the proportioning and relationship of the parts is such that the weight of the presser arm 90 overbalances the effect of the weight 96 to cause the arm 90 and the presser foot 94 to move out of the path of the new supply roll. After the latter is placed in position and its shaft 74 is secured in operative position by the roller 76, the sliding weight 96 is released from its inner position and is moved toward the outer end of the arm 98 so that it may be effective to raise the presser foot 94 into its position of frictional contact with the supply roll.

As the paper moves from the supply roll to the roll stand it passes under a bar or roller 104 which is supported at its ends by arms 106 and 108 preferably journalled about the axis of the supply roll. Thus the paper sections 110, 112 and 114 are maintained substantially straight and the desired tension is maintained on the paper. In addition I have found it important to insure the parallelism of the arms 106 and 108 in all of their movements, or to otherwise insure that the ends of the roller always have the same movements.

In front of the roll stand 12 the paper is trained over a guide rod 120 (Fig. 4) and it passes from this rod beneath another rod 122 which is located in proximity to the recessed driven roller 16, the paper passing between the rod 120 and the roller 16 at such a position that the paper is always maintained in contact with at least a third of the circumference of the recessed roll 16.

By reason of the rotation of the recessed roll 16 in the direction of the arrow 86 (see Fig. 4) the paper is maintained under slight tension between the supply roll and the roll stand and sufficient frictional engagement between the paper and the recessed roll 16 for this purpose is maintained by the rubber faced idler roll 124. The trunnions or the ends of the shaft of this roll are freely rotatable in the roll stand and additional frictional engagement between the paper and the recessed roll 16 may be provided by another idler roll 126 which is freely rotatable in the roll stand and is mounted in such a manner that it rests upon the roll 124.

*Strip cutting mechanism*

The cutter roll is a cylinder having its shaft or trunnions journalled in anti-friction bearings in the roll stand sides 130 and 132. Its knives 18 and 20 are in the nature of saw tooth blades as indicated in Fig. 5 of the drawings and they are positioned in slots which are milled in the outer surface of the cutter roll along lines parallel to the longitudinal axis of the roll. The teeth of the knives have such action that they will readily cut through the paper with a minimum of resistance and the knives are held rigidly in their operative positions by means of set screws 134 and 136 positioned within the circular confines of the roll.

Because of the necessity for quick and clean cutting action on the part of the cutter knives, the machine is arranged so that the knives contact the paper as it is stretched across one of the recesses 22 and 24 in the presser roll 16 and it is essential that the proper angular relationship of the rolls 14 and 16 be maintained in order that the knives may not contact with the surface of the roll 16 beyond the confines of the recesses 22 and 24.

In order that the operator may know of the exact angular relationship of the cutter knives with reference to the recesses in the presser roll 16 visual indicator means or a "tell-tale" is provided exteriorly of the machine. This means includes a disc 140 (see Fig. 10) keyed to the trunnion or shaft 142 of the cutter roll. This disc is of the same outside diameter as the cutter roll and it is provided with "tell-tale" knives 144 and 146 of the same cross-section as the main knives of the cutter roll and similarly mounted within the "tell-tale" disc. In order that the "tell-tale" knives may be accurately aligned with the main cutter knives the knife slots in the "tell-tale" disc 140 are formed or milled during the operation which forms the slots for the main knives and this is done after the disc is keyed to the shaft.

Upon the shaft 150 of the presser roll 16 and located exteriorly of the roll stand there is a second "tell-tale" disc 152 of the same diameter as the presser roll 16 and aligned with the disc 140. This disc 152 is fixed to the shaft 150 so that the knife recesses 170 and 172 are always in exact alignment with the similar recesses 22 and 24 of the roll 16. The disc may be provided with slots 160, 162 and 164 through which project pins 154, 156 and 158 fixed with reference to the sprocket 182 which directly drives the roll 16. These pins are preferably screw threaded so as to receive nuts by which the disc 152 may be held in a predetermined angular relation to the sprocket.

If at any time, the operator sees that the "tell-tale" knives 144 and 146 are not co-operating properly with the recesses 170 and 172 in the disc 152 he can release the disc 152 from its sprocket 182, position the disc and its recesses properly with relation to the "tell-tale" knives and thereafter tighten the disc 152 relative to the sprocket so that the proper relationship of the main cutter knives 18 and 20 with reference to the recesses 22 and 24 is restored.

The cutter roll 14 and the presser roll 16 are driven at the same speed and in opposite directions by means of a sprocket chain 180 which is indicated in Fig. 10 of the drawings. The chain is trained over the top of a sprocket 182 on the shaft 150 and underneath the sprocket 184 of similar size mounted on the shaft 142 of the cutter roll 14. Then the chain passes over a sprocket 186 aligned with the above indicated sprockets and mounted upon a countershaft 188 which is journalled in slidable bearings 190 and 192 mounted in the sides of the roll stand frame (see Fig. 8).

Each of the journal blocks or bearings 190 and 192 has a stud bolt 194 fixed therein as indicated in Fig. 4 of the drawings, this bolt passing freely through a clear hole in a stationary plate 196. Between the head 200 of the bolt 194 and the plate 196 there is a compression spring 202 which tends to move the shaft 188 in such direction that the sprocket chain 180 is maintained in operative condition, and excessive movements of the chain and the shaft during normal operation may be prevented by screw-threading a nut upon the bolt 194 in such position that the spring 202 causes this nut to normally abut the left hand side of the plate 196.

In the event that the paper accidentally starts to wind up around the presser roll 16, it immediately causes the presser roll to move slightly to the left (in Figs. 4 and 10). This causes the friction disk 151 adjacent the "tell-tale" disk 152 to contact the release block 210 and, by mechanism which will be hereinafter described, immediately stop the operation of the machine. The presser roll 16 is allowed to have such movement away from the cutter roll 14 by reason of the mounting of its shaft or trunnions in slidable journals 212. These journals are slidably mounted in guide-ways in the sides of the roll stand frame and they are provided with sockets in which compression springs 214 are disposed. These springs are maintained under the desired compression to hold the presser roll 16 in its operative position, by screw threaded set screws 216 screw threaded into fixed upright plates 218. The inner ends of these bolts pass freely into the spring sockets in the journals 212 and compress the springs 214 to the desired degree. They are held in the desired position by lock nuts 220 mounted upon the bolts 216 and locked against the plate 218.

Beyond the position at which the paper is cut into stick strips the paper extends through an upright passage 229 defined on one side by the fixed guide member 230 (see Fig. 4) and on the other side by a second guide member 232 which is held between the presser roll 16 and the rubber faced roll 32. The guide member 232 has its upper and lower surfaces preferably shaped to correspond with the surfaces of the rolls 16 and 32 in order that it may fit closely and provide as little opening as possible through which the paper might accidentally pass.

The crimping mechanism

Below the guide member 232 the passage-way 229 is continued by the surface of the rubber faced roll 32 and at the lower end of this passage the crimper roll 30 is located. The arrangement of this crimper roll with reference to the associated elements is clearly indicated in Figs. 4 and 12 of the drawings. Its construction is indicated in Figs. 6 and 7. It consists of what may be termed a fluted steel shaft, presenting a number of sharp ribs 240 running parallel to its axis. At its ends the crimper roll is formed so as to present trunnions which are rotatably mounted in bearings in the sides of the roll stand frame.

The crimper roll is also machined with a plurality of spaced grooves 242 to receive strippers 244 which are fixed to the plate 246.

The crimper roll is driven by the rubber faced indenter roll 32 rotatably mounted in journal blocks 248. The latter are spring pressed toward the crimper roll by set screws 250 and other associated means similar to the means which are above described with reference to the journal blocks 212 for the presser roll 16. The pressure upon the journal blocks 248 is so regulated as to cause the ribs 240 of the crimper roll 30 to be indented into the rubber or other resilient layer 252 of the roll 32.

Thus the paper in passing from the point at which it is cut by one of the knives 18 and 20 is sharply crimped along parallel lines and is simultaneously gripped so that it is caused to advance.

The convoluting mechanism

As the operation of the machine continues the leading edge of the paper proceeds around the crimper roll 30 until it is removed from the crimper roll by the strippers 244. The initiation of this action is indicated in Fig. 4 of the drawings in which the leading edge 260 of a stick strip is just beginning to be moved away from the crimper roll. This situation is also indicated in Fig. 12 of the drawings.

As the crimper roll continues to rotate, the leading edge of the released stick strip contacts with a gripping surface of a layer of material 262 which faces the lower surface of the fixed plate 246. Then the spring action of the released part of the paper is effective to cause the paper to assume the position indicated at 264 in Fig. 13. In this position the lower edge of the partially formed loop of paper contacts with the belt 40 and is caused thereby to move to the right.

Further continued action of the parts and the effect of the crimping on the leading edge of the paper causes the initial convolutions to begin to form as indicated in Fig. 14 of the drawings. The belt 40 by reason of its effect upon the lower part of the released paper strip then promotes further convoluting action until the first convolution is complete as indicated at 270 in Fig. 15 of the drawings. Thereafter, the loosely convoluted paper roll is released from the crimper roll and its number of convolutions is increased by reason of the gripping surface of the fixed layer 262 and the relative movement of the belt 40 to the right. The action continues in this manner, increasing the number of convolutions of the roll and decreasing the size thereof, as the roll proceeds down the passage-way 280 between the belt 40 and the surface of the layer 262. This passage-way is tapered as clearly indicated in Figs. 12 to 17 inclusive so that it decreases in size, away from the crimper roll 30.

As the convoluting roll 270 (see Fig. 15) proceeds along the convoluting passage-way 280 it becomes somewhat ovate, or egg-shaped, as indicated in Fig. 16 of the drawings, and if this action were continued, a condition would soon be reached wherein the convoluted strip would not be rolled. This would result from the increasing resistance of the convolutions to the effect of the movement of the belt 40. Such a condition would not only defeat the main purpose of the apparatus but it would also cause a stoppage of the machine by reason of the piling up of the convoluted strips in the passage-way between the belt 40 and the lower surface of the pressure plate. To prevent such action the pressure plate structure may be formed somewhat as indicated in Fig. 37 of the drawings. Here the lower portion of the pressure plate RS is formed so as to present the inclined upper surface of one of a series of convoluting and compacting passage-ways. As shown the section RS is inclined with reference to the upper surface of the belt 40 and the end of this section adjacent to the plate structure 246 is spaced upwardly of the lower surface of the facing material 262 so as to present a recess 284 in which the egg-shaped convoluted roll may assume a more nearly round cross section as soon as it leaves the end of the convoluting passage-way between the bottom of the plate 246 and the belt 40. This action not only results in the loosely convoluted roll assuming a substantially circular cross section but it also results in a tendency to straighten the roll as it assumes a condition somewhat similar to that indicated at 284 in Fig. 17 of the drawings.

As the roll 285 proceeds down the compacting passage-way section RS it again becomes somewhat ovate at the point S and it is again allowed to expand slightly by reason of the relationship of the pressure plate section ST with reference to the section RS. It will be noted from an inspection of Fig. 37 that the leading end of this section ST has much the same relation to the discharging end of the section RS as the leading end of the latter had to the discharge part of the passage-way 280.

It is the preferred arrangement that the roll is more compacted, and has more convolutions at the end of the passage-way RS than at the end of the convoluting passage-way 280, and that at the end of the section ST the cross section of the roll is still smaller.

Beyond the compacting convoluting section ST there may be a short similar section TV which permits the smaller egg-shaped roll to again reform and straighten before it enters the longer compacting passage-way 286. The latter is preferably without any taper and it is long enough to sufficiently increase the time factor of the compacting and bonding action of the apparatus. During the passage of the rolls through the compacting passage-way 286 they are subject to considerable pressure in order that they may be given a permanent set and become thoroughly bonded.

The positions indicated by R,S and T may be considered as stick shaping or roll shaping positions inasmuch as the desired shape of the ultimate product is perfectly circular in cross section.

Sealing or bonding fluid is applied to the belt 40 by means of rollers 290 and 292. The upper surfaces of these rollers are in contact with the lower run of the belt and as they rotate they move through a body of fluid 296 preferably maintained at a constant level in the pan 298. As shown the pan is provided with baffles 300 and 302 which minimize undesirable disturbances of the surface of the fluid within the pan. These baffles are preferably provided with openings so that the fluid may flow from a chamber on one side of the baffle to a chamber on the other. The fluid level within the pan 298 is preferably maintained at a desired position by the location of an adjustable outlet at the upper end of the drain pipe 304.

Thus, one side of the paper has been moistened before the occurrence of the actions indicated in Figs. 12 to 17 inclusive. However these actions take place so rapidly that the fluid hardly has time to substantially change the texture or condition of the paper to any appreciable extent before the rolls enter the compacting passage-way 286. This passage-way is relatively long as indicated in Fig. 2 of the drawings and, at least for a portion of its length, it is tapered so that it decreases in cross-section toward the discharge end of the machine. In this way, and because the surfaces of the passage-way are relatively unyielding, pressure is exerted on the rolls while they are being compacted, and the condition of the paper is caused to change to such an extent that the convolutions of the rolls become bonded and the rolls become permanently set.

When the material employed in the illustrative manufacture is a sized paper and the bonding fluid applied to the conveyor 44 is water, the sizing of the paper may be so affected as to promote effective bonding and sealing of the convolutions of the ultimate product. This action should not, however take place until the paper rolls are so reduced in diameter that their final dimension is at least closely approached, as, otherwise it might interfere with the compacting of the rolls by retarding the relative movement of their adjacent convolutions necessary in the compacting action.

The illustrative method is such that the bonding fluid is first applied to the paper sufficiently ahead of the final bonding zone that the fluid may have time to affect the paper sizing and develop its bonding property. Also, this same end is promoted by the convoluting action and the pressure of the compacting. However, when the paper initially contacts the conveyor the former begins to remove the bonding fluid from the upper surface of the belt and to distribute it over the surfaces of the convolutions of the loosely convoluted paper tubes or rolls. Thus, that portion of the active surface of the conveyor in the first part of the compacting zone and the following (or external) convolutions of the paper tube may not have their surfaces particularly affected by the presence of the fluid to any great degree. In fact, the exterior convolutions may not have enough fluid therein to permit the bonding and sealing to be completed. This invention involves the overcoming of such conditions by providing a conveyor with an absorptive surface in order that the pressure by which the compacted rolls are forced against the absorptive surface in the bonding zone may cause fluid absorbed in the conveyor to be brought to its surface where it can be transmitted to the surface of the compacted roll in order that it may effect its intended result of facilitating the bonding and sealing of the roll.

There is a time factor involved in the compacting of the rolls as they proceed through the passage-way 286 and this time factor in combination with the pressure and the rolling-up effect of the belt 40 combine in such way to produce the permanent set of the rolls.

The discharge end of the compacting passage-way is indicated in Fig. 18 of the drawings. Here the compacted rolls pass along toward the end of the pressure plate structure 44, and during their movement toward this position it has been found that some of the rolls may be slightly bowed probably because of the difficulty in maintaining absolutely uniform pressure throughout the width of the belt 40 and the plate 44. To correct this condition and to insure an arrangement of the rolls 312 wherein they are 90° to the direction of travel of the belt 40 at a point immediately in advance of the cutters 322 the aligning mechanism shown in Figs. 30 and 31 of the drawings is employed. This includes the top frame 307 which is pivoted along its forward edge by a rod 309. Fixed to the frame and extending downwardly therefrom is a lifting and straightening member 311. This member may move through an opening in the presser plate 44 and it is provided with the upwardly and forwardly inclined cam face 313 along its lower surface.

The frame 307 also has fixed thereto the stop 315' which moves vertically in an opening between the rear edge of the pressure plate structure 44 and the cutter frame for the knives 322. When the belt 40 causes one of the rolls 312 to move against the cam face 313 the frame 307 is raised slightly but the contacting roll continues to advance under the cam face. As soon as the roll passes out of contact with this face the roll is liberated from the downward pressure created by the spring 317 and it is allowed to straighten. Then as it feeds along the belt 40 it contacts the stop 315' which squares it up 90° to the belt. When the succeeding stick or roll engages the cam face 313 it raises the stop and permits the squared up roll to advance to the cutters 322.

The spring 317' is adjustably confined between the frame 307 and a stop 319 so that the compression of the spring may be varied, as desired, to produce the indicated result.

In the zone between the lifting member 311 and the stop 315' the space between the belt 40 and the plate structure 44 is slightly greater than the corresponding space beyond this zone to facilitate the straightening and "squaring up" action of the stop 315'.

The stick cutter

The block 314 is representative of a series of blocks 315 to 318 inclusive which are fixed in a frame 320 which is held rigid with reference to the pressure plate structure 44. These blocks are also held in such positions that their lower surfaces form a substantial continuation of the upper surface of the discharge end portion of the passageway 286. The blocks 314 to 318 inclusive have the knives 322 frictionally held thereby. The leading edges of these knives are practically even with, but certainly not below the lower surfaces of the blocks, and the rear ends of the knives extend into the passage-way 286 at least to an extent which is about half the diameter of the compacted rolls 312. The knives are accurately positioned between the blocks 314 to 318 by means of pins 330 and 332, which are freely slidable in openings provided in frame 320. Aligned openings are formed along the facing edges of the blocks in order that the pins 330 to 332 may be moved so as to dispose the knives in the positions above described and indicated in Fig. 18.

The knives 322, each one of which is positioned between a pair of facing surfaces of blocks 314 to 318 inclusive, are first caused to be frictionally gripped by slightly tightening the nuts 334' and 336' on the end of the through rods 334 and 336 and the knives are thereafter accurately positioned with reference to what will ultimately be the lower surfaces of the blocks. After the knives are thus positioned the nuts on the through rods 334 and 336 are tightened so that the knives are permanently gripped in their operative positions. All of these operations may take place while the entire knife supporting frame 320 is separated from the machine.

The blocks 314—318 are held in their fixed positions vertically by the cap screws 340—347 the heads of which bear against the top of knife supporting frame 320 as indicated in Fig. 20 of the drawings. There are two groups of these cap screws, one group located at the front edges of the blocks 314—318 and the other group located at the rear edges of the blocks. When these screws are turned their screw threaded lower ends enter correspondingly threaded holes in the blocks 314—318 and the blocks are tightly positioned against the lower ends of the downwardly projecting ribs or legs 350—352 of the knife frame 320.

The assembly of the knives 322 and the blocks 314—318 in their correct positions is promoted by the provision of an aligning rib 360 (on each of the blocks 314—318 inc.) which fits closely within the correspondingly shaped recess formed in the lower end of the leg 352, and this assembly is further facilitated by the provision of a cross bar or stop bar 364 provided with an upwardly extending rib 366 which abuts against the surface of the leg 368 extending downwardly from the following edge of the knife frame 320.

The knife frame 320, with all its component elements above described, constitutes a unitary body which may be rigidly and releasably fixed within an opening 380 provided by the frame members 382, 384 and 386 which are preferably integral with the presser plate structure 44. Thus when the entire presser plate structure is held fixed with reference to the upper surface of the belt 40 (which is determined by the fixed bed plate 390) space between the lower surface of the entire knife assembly and the part of the belt 40 beneath it forms a continuation of the compacting passage-way and the compacted rolls are quickly severed as they proceed to the discharge end of the machine.

The stick cutter assembly above described severs the compacted rolls into lengths which are desired for particular types of confection supports, the desired lengths 50 being thereafter separated from the selvage ends 49 by the members shown in Figs. 22, 24 and 25 of the drawings, these members being mounted upon the wiper bar 52 which is wedge shaped at its upper side as indicated at 402 in Fig. 25. The upper edge of this bar is disposed at a position closely adjacent to the surface of the belt as it passes around the roll 46, as indicated in Fig. 2 of the drawings.

Driving mechanism

The parts of the illustrated machine are so arranged that the drive is to the discharge end of the conveyor belt 40, and this conveyor is utilized as a means for driving the strip cutting mechanism and the crimper. After the strip cutting mechanism is rendered inoperative the belt may continue in operation until machine is cleared or the complete machine stopped automatically when desired.

As indicated in Fig. 1 of the drawings an electric motor 410 is mounted within a recess 412 in the frame, this motor driving a countershaft 415 by means of a driving pulley 416, a plurality of belts 418, and a driven pulley 420, fixed to the countershaft 415. The drive from the countershaft 415 takes place through a driving sprocket 422 and a sprocket chain 424 to a sprocket wheel 426 fixed upon the second countershaft 428. From this countershaft the drive is direct to the shaft 430 upon which the conveyor belt pulley or roll 46 is non-rotatively mounted. The connecting elements include a driving sprocket 432 fixed upon the countershaft 428, a sprocket chain 434, and the main sprocket wheel 436.

The sprocket chain 434 is maintained in operative condition by an idler pulley 440 rotatively mounted upon an arm 442 which is caused to move upwardly around its pivot 444 by means of the counterweight 446 mounted upon the arm 448. The counterweight is slidable along this arm in order to vary the tightness of the sprocket chain 434.

The arm 448 may be rigid with the idler sprocket arm 442 and the combined structure rotatable about the shaft 444. When this arrangement is utilized this shaft may be also used to maintain the lower run of the conveyor belt 40 tightened and thereby disposed in a substantially horizontal plane. This may be effected by an idler roller or pulley 450 which is indicated in Fig. 2 of the drawings as rotatively mounted upon upwardly extending crank arms 452. These crank arms are fixed to the ends of the shaft 444 and, at a position externally of the frame of the machine, there is secured another crank arm 454 with a counterweight 456 fixed to the shaft 444. The conveyor belt will thus be maintained under sufficient tension, and the arrangement is such that the weight 456 and the arm 454 may be moved upwardly until the pulley 450 is brought into alignment with the opening 460 in the frame. This pulley may be thereafter moved through this opening to facilitate inspection or repair of the conveyor belt.

Mounted beneath the rear conveyor belt pulley 46 is a belt cleaner in the form of a rotating brush 462. This may be driven from the countershaft 415 by means of a sprocket chain 464.

The drive through the conveyor belt to the crimper and the strip cutting mechanism at the forward end of the machine takes place through the shaft 500 and the roll 306 over which the conveyor belt 40 is trained. At the end of the shaft 500 there is fixed a control belt pulley 502 and a similar pulley 504 is fixed upon a countershaft 506 rotatably mounted at a position beneath the shaft 500. A flat drive control belt 508 is trained around these pulleys with enough slack to permit the movement of the idler belt tightener (drive control) pulley 510 to control the drive from the shaft 500 to the shaft 506, and hence the drive to the strip cutter and the crimper. This idler pulley is rotatably mounted at the end of the crank arm 512 which is fixed upon a shaft 514 journalled in the main frame and extending outwardly thereof on both sides of the machine. At one side of the machine, as indicated in Fig. 21 of the drawings, this shaft 514 has a handwheel 516 non-rotatively mounted thereon, and at the opposite side of the machine there is a grooved wheel 520 fixed to the shaft. Thus the drive from the shaft 510 through the shaft 506 to the roll stand may be initiated or controlled by the operation of the handwheel 516 by the attendant.

The drive from the countershaft 506 to the roll stand takes place through a sprocket wheel 521 fixed to the countershaft 506, a sprocket chain 522 trained around that sprocket, and an aligned sprocket 524 fixed upon the shaft 188. Thus, power is transmitted to the cutter roll, the presser roll and the crimper by means of the driving connections which have been previously described.

*Automatic control of roll stand drive*

The grooved wheel 520 is utilized as part of means to effect a stoppage of the drive to the crimper when the paper supply roll is exhausted, or when the machine begins to operate improperly so as to cause the paper to wind up on the presser roll as above referred to. The connections whereby such automatic action is effected will now be described.

A cable 600 has a portion of its length disposed within the groove of the wheel 520 and one end of the cable is fixed to the rim of the pulley preferably at a point at the right hand side of a vertical plane passing through the axis of the shaft 514. Thus the cable extends part way around the pulley, and its free end is fixed to a weight 602 which is guided in its vertical movements by a housing 604 secured to the framework of the machine. The idler pulley 510 is constantly biased toward the position in which it is shown in Fig. 10, a position in which the belt 508 is tightened so as to transmit drive from the conveyor belt 40 to the cutter and the crimper. This is accomplished by a counterweight 606 (Fig. 1) mounted upon a crank arm 608 which is fixed for movement with the arm 512. The weight 602 is sufficient to overcome the normal effect of the counterweight 606 and thus when the weight 602 is allowed to drop from the position in which it is shown in Fig. 9 it will rotate the wheel 520 and shaft 514 to move the idler 510 from its crimper operating position in Fig. 9 to the drive interrupting position indicated in Fig. 10.

The weight 602 is provided along its forward edge with ratchet teeth 610 which are adapted to be engaged by a pawl 612 on an arm 614 fixed to a pintle 616 which is biased in a clock-wise direction by the coil spring 615 acting upon the crank arm 617. The horizontal portion 618 of this arm is slotted so as to receive the upright part 620 of a crank arm 622 pivoted at 624, the horizontal portion 626 of this crank arm being in the path of a weight 630 which is freely slidable vertically in a guideway formed by the fixed members 632. The relationship of these parts is such that when the weight 630 drops from its upper position indicated in Fig. 9 of the drawings to its lower position indicated in Fig. 10 it will strike the horizontal part of the crank arm 622 and cause the upwardly extending part of this crank arm to engage a pin 640 extending across the slot in the pawl 614. This will pull the pawl out of contact with one of the ratchet teeth 610 and permit the weight 602 to drop, thus disconnecting the drive from the conveyor belt 40 to the cutter roll 14 and the crimper.

The weight 630 is held in its elevated position by the engagement of the pawl 642 in a toothed recess 644 in one side of the weight. This pawl is pivoted at 646 and is biased toward the weight 630 by means of a small diameter coil spring 650 secured at one end to a weight 652, trained around a pulley 654 and having its other end secured to the free end of the pawl 642.

Pivoted on the pintle 660 which passes through the pawl 642 is a link 662 which has a pin and slot connection 664 and 666 with the upper end of a crank arm 668 fixed to the shaft 92 upon which the friction brake 94 for the paper supply roll 10 is mounted. Thus when the supply of paper on this roll is about to be exhausted, the shaft 92 will be turned counter-clockwise by reason of the action of the counterweight 96 and sprocket and chain connections between the shafts 92 and 100. The crank arm 668 will be thus moved from its Fig. 9 position to its Fig. 10 position in which it pulls the detent on the pawl 642 from its recess in the weight 630 and permits the latter to fall so as to release, in turn, the pawl 614 and allow the weight 602 to drop so as to interrupt the drive to the crimper and its associated strip cutting mechanism.

*Drive interruption due to wrong paper travel*

The mechanism for interrupting the drive to the crimper as above described is also utilized as a part of the means for interrupting the same drive in the event that the paper fails to proceed properly through the roll stand, winding up around the presser roll 16. This mechanism includes a weight 670 freely slidable vertically in a guide 672 and formed at its lower end as a wedge or cam 674. This weight is held in its uppermost position by the reason of the engagement of the detent 676 in a recess 678 in the weight and when the paper winds up upon the roll 16 the tooth 676 is released so that the inclined surface of the cam 674 may strike the upper end of the pawl 642 and allow the weight 630 to drop from the position in which it is shown in Fig. 9. This interrupts the drive to the crimper as above indicated.

The tooth 676 is formed as a part of a weighted lever or crank arm 680 which is normally biased towards its Fig. 9 position by its weighted end 682. The member 210 may be considered as a unit with this crank arm, the entire unit being freely pivotable on the stud or trunnion 120. Thus when the paper winds up on the roll 16, the bearings for the cutter roll 14 being fixed, the roll 16 is moved slightly to the left, and the surface of the member 210 nearest the periphery of the "tell-tale" disc 152 is contacted and slightly moved by the latter. Almost instantaneously with the contact of these parts, the entire crank arm including the parts 210, 680 and 682 is pivoted enough to allow the weight 670 to drop and the drive to the crimper to be disconnected.

Manual initiation of operation

Before a new paper supply roll is placed in position the crank arm 668 is returned to the position in which it is shown in Fig. 9 of the drawings by reason of the locking of the counterweight 96 at a position adjacent to the shaft 100. Then the weight 652 urges the tooth of the pawl 642 against the weight 630 but the parts still remain in their inoperative relationships as indicated in Fig. 10 of the drawings. In this condition of the driving parts the operator may then actuate the handwheel 516 to gradually swing the idler to the left so as to slowly move the presser roll. This operation is utilized in threading the paper from a new supply roll around the presser roll and then between it and the rod 120 and the resilient faced roll 104. However, when the paper has been properly threaded into the machine and the operator desires to start the normal operation, means are provided for this purpose at a position adjacent the handwheel 516. This means includes a rod 690 journalled transversely of the frame and provided with a knurled operating disc 692 at one side of the machine. At the other side of the machine and adjacent the automatic control mechanism shown in detail in Figs. 9 and 10, the rod 690 has fixed thereon a crank arm 694. This arm is pivoted to a link 696 which is, in turn, pivoted at its lower end to one member of a crank arm 698. The other member 700 of this crank arm is in the path of the crank arm portion 626 and slightly below it so that when the rod 690 is turned clockwise (see Fig. 9), the arm 700 is moved upwardly to strike the arm 626 and raise it. This action results in the elevation of the weight 630 from its inoperative position as indicated in Fig. 10 to its operative position as indicated in Fig. 9. The pawl 642 then holds the weight 630 in its elevated position and the machine thereupon can be put into normal operation by turning the handwheel 516 so as to raise the weight 602 through the intermediacy of the cable 600 and the grooved wheel 520.

The compacter

As indicated in Fig. 23 of the drawings the bedplate 390 is a heavy casting reinforced by ribs 702 on its lower side. It is supported at the correct level, or at the desired inclinations to determine the characteristics of the compacting passage-way 286 by supports 704 and 706 which are rigidly secured along the upper edges of the main frame members of the machine.

The pressure plate structure 44 is likewise a heavy casting, reinforced by upwardly extending ribs 708 so as to provide as rigid and strong structure, other factors being taken into consideration as embodying limitations thereon. The upper plate structure 44 is hinged at its right hand side (see Fig. 23) about pivots 710 and is counterbalanced by weights 712 so that it is easily swung from its operative position (as illustrated in Fig. 23) to its vertical position to permit inspection and repair. The construction whereby the upper plate structure is permitted to move about the pivots 710 is indicated in Figs. 28 and 29 of the drawings, and the means for locking this plate structure in its operative position is indicated in Figs. 26 and 27. The latter means consists of cam locking members 716 operated by handles 718 and moved with a break-joint action from the dotted line position indicated in Fig. 26 to bring the parts 719–721 to vertical position. The handle 718 is then swung so as to move the cam member 716 along a cooperating cam surface 724 to press the upper plate structure exactly to its operative position and hold it rigidly therein.

It may be necessary from time to time during the operation of the machine to move the pressure plate structure 44 to its inoperative position. For example, occasion for this may arise when it is desired to inspect the surface of the belt 40. Similarly it may be desirable at times to inspect the conditions of the rolls at various stages in their procedure through the apparatus. It may also be desirable at times for the purpose of adjusting the parts of the cutter mechanism indicated in Figs. 18–20 or to substitute different cutter parts.

When the pressure plate structure is to be moved to its inoperative position, the cam locks (see Figs. 23 and 26) are released by moving the hand lever 718 from the full line position in Fig. 26 to the dotted line position. Then the handles 800 can be grasped to turn the pressure plate upwardly. The plate with its appurtenant devices is exceedingly heavy and costly. It is therefore important that there be no breakage of the plate or its associated parts during its movement to or from operative position. Such breakage during the upward movement of the pressure plate may be prevented by the spring-pressed bumper elements secured to the members 804 (see Fig. 3) which are fixed rigidly to the top of the pressure plate.

The lower and operative face of the pressure plate 44 may be formed by a layer 709 cemented to the plate. This layer must be substantially non-absorbent and must have a high resistance to compression to withstand the pressure exerted during normal operation of the apparatus.

The automatic stop is set to stop the feeding mechanism and the crimper when the paper roll is exhausted to within about 20 feet, which is about as close as is safe to work, because near the core on which the paper is wound, the paper is more or less wrinkled. When the operator reaches the machine after it has been stopped by means of the automatic device, he starts machine and operates the feeding mechanism by holding the belt tightener against the belt by means of the hand wheel and when in his judgment no more of the paper should be used, he releases his hold on the hand wheel, which will stop the feeding mechanism. He then removes rolls 126 and 124 (Fig. 4) and draws a knife across the paper, using either recess in roll 16 as a guide. This cuts the paper square, and the part left in the machine is the proper length. The outside strip is thrown away.

After a new supply roll has been placed in operative position the leading edge of the paper wound on that roll is slipped between the bar 122 and the straight edge 816 and the latter is then pressed tightly down against the bar 122. The paper is then torn so that it presents a straight clean edge normal to the path of movement of the paper through the machine. Thereafter, with the weighting rollers 124 and 126 in their inoperative positions the leading edge of the paper is threaded over the bar 120 and through the opening between the bar 122 and the presser roll 16. The rolls 14 and 16 are then turned slightly so that the leading edge of the paper on the supply roll may be passed between these rolls and into such a position that it squarely contacts one of the cutting elements 18 or 20. Then the end of the paper is allowed to rest in that position while the rolls 14 and 16 are turned sufficiently to grip the paper and hold it in its correct position. Thereafter the loop of the paper between the supply roll and the bar 120 is pulled so as to cause the paper to lie smoothly against the upper surface of the roller 16. Then the weighting rollers 124 and 126 are placed in their operative positions in which they are indicated in Fig. 4 of the drawings.

Such manipulation of the rolls 124 and 126 may be permitted by vertical slots in the forward end of the plates 130 and 132, these slots being wide enough to permit the shafts or trunnions of the rolls 124 and 126 to rotate freely therein.

For desired control of the wetting of the belt 40 the mechanism indicated in Figs. 35 and 36 is provided. This includes three shafts 850—852 extending transversely of the frame and journalled therein. Each shaft has a pair of eccentrics fixed thereon as indicated by the numerals 854 to 859 inclusive. The eccentrics are of the same size and design and they are so secured to the shafts that when the shafts are moved in unison through a predetermined angle the eccentrics will all have the same effect in raising or lowering the pan 298 which rests upon them.

Externally of the frame of the machine the shaft 850 is provided with a sprocket 860 which is connected by a sprocket chain 861 with a sprocket 862 of the same diameter as the sprocket 860 and fixed upon the shaft 851. At the opposite end of the shaft 851 there is fixed a sprocket 863 connected by sprocket chain 864 with a similar sprocket 865 fixed upon the shaft 852. The sprockets are all of the same size so that when the shaft 852 is turned by the hand wheel 866 the pan will be raised or lowered, depending upon the position of the eccentrics and the direction in which the hand wheel is turned. Thus when it is desired, during some period of adjustment or repair in which the machine is inoperative the pan may be lowered by turning the hand wheel 866 so that the moistening rolls 290 and 292 are out of contact with the fluid in the pan. Thereafter the belt driving pulley 46 may be turned so as to move the belt for the purpose of cleaning or repair without wetting it. There are also other times in which the above described mechanism is of considerable importance. For example something may happen to the continuous supply of fluid to the pan 298 and it may be noticed that the level of the fluid is too low. In such a case the mechanism indicated in Figs. 35 and 36 may be so operated as to bring the fluid level to the desired position.

It has been found that there are, in many cases, defects in the paper supply. They have particularly been found near the centers of the supply rolls. Sometimes the paper has become folded at this position so that a thicker portion of paper, or a convoluted roll having some of its body of thicker convolutions starts to move through the machine. In such cases the convoluting and compacting passageway above the belt 40 may become clogged and the pressure of the belt against the bedplate 390 may be such as to cause the speed of the belt to decrease. Such a situation becomes aggravated with the continued piling up of the convoluted rolls against the portion of the passageway which has become clogged and it is therefore important that the movement of the belt 40 be stopped immediately upon any substantial increase to the resistance to movement of the belt or decrease in its speed.

For the purpose of instantly stopping the movement of the belt 40 under such conditions I have provided the control devices which are indicated in Figs. 38 and 39 of the drawings.

As indicated in Fig. 38 the shaft 500 upon which the fluid roll 292 is mounted has fixed thereon a beveled gear 870. This gear meshes with a driven pinion 872 fixed upon an upright governor shaft 874 journalled in an upper bearing 876 and a lower bearing which may be secured to the bracket 878 which, in turn is fastened to the side frame member 62.

The governor shaft 870 has a collar 880 fixed thereon beneath the bracket 878, and this collar supports four or more centrifugal arms, three of which are indicated in Fig. 38 at 881—883. These arms are so pivoted on the collar 880 by pins 886 that they may be freely moved.

From each one of the centrifugal arms 881—883 a link 890 extends downward to a collar 892 which is freely slidable on the shaft 874, each link 890 being freely pivoted to a centrifugal arm at its upper end and freely pivoted to the collar 892 at its lower end.

Directly beneath a contact member 894 on the lower end of the collar 892 is a movable contact element 896 of an electric switch which may be of the push button type. This switch being connected by the conductors 900 and 902 in the power line to the driving motor 410. This switch is of the normally closed type, the contact element 896 being pressed into its normal position by a spring such as that diagrammatically indicated at 904 in Fig. 39.

During normal operation the belt 40 and the shaft 500 travel at such speeds that the centrifugal elements 881 and 883 assume the normal positions which are indicated in full lines in Fig. 38. Under these conditions the contact 894 is held by the links 890 out of contact with the switch member 896, or in the position in which it is indicated in full lines in Fig. 38. However, when the resistance to the movement of the belt 40 is increased for any reason and the speed of the belt correspondingly decreases, the R. P. M. of the shaft 874 decreases to such an extent that the centrifugal arms 881—883 drop to the dotted line positions indicated in Fig. 38. This permits the contact member 894 to engage member 896, actuate the switch, and open the circuit to the driving motor 410.

The relationship of the Fig. 38 control mechanism to the circuits through the motor 410 are diagrammatically indicated in Fig. 39 in which the load lines are indicated at 910 and 912. During normal operation the current may be considered as passing though the line 910, the lead 902, the switch 914, the lead 900, and thence through the line 916 to the terminal 918 of the motor 410. The load line 912 is directly connected to the terminal 920 of the motor.

When the switch 914 is opened by the above described action of the governor it is held open by the governor until the machine is started up and the speed of the belt attains a normal value. Accordingly it is necessary to provide a shunt line 930—932 from the load line 910 to the motor terminal 918 and across the switch 914. Between the elements of the shunt line a hand operated switch 934 is interposed.

When it is desired to start the machine the switch 934 is closed until the belt 40 attains a normal speed. When this happens the centrifugal arms of the governor attain the positions at which they are indicated in full lines in Fig. 38 and the contact member 894 allows the spring 904 to close the switch 914. Thereupon the shunt switch 934 is opened so that the governor may be effective in the manner above indicated.

Related subject matter is claimed in my co-pending applications No. 354,945 and No. 407,917 claiming subject matter shown but not claimed in the instant application.

Whereas the invention has been described with reference to certain specific embodiments thereof, in compliance with the Federal patent statutes, and particularly section 4888 R. S., it is to be appreciated that the invention is not to be considered as limited to all of the details of these embodiments. The invention is also to be considered of such a scope that it covers considerable modification of the detail of the embodiment, within the scope of the subjoined claims.

I claim:

1. A candy stick machine comprising, in combination, a crimper roll, means co-acting with said roll to cause paper strips to be formed about the roll to give the strips a curling-up tendency, means acting upon the formed strips to successively release them from the roll, means acting upon the released strips to promote their curling up tendency resulting from said forming action and to develop loosely convoluted paper rolls, means for compacting the latter into permanent set rod-like master sticks, and means cutting each master stick into a plurality of candy sticks while continuing said compacting action.

2. In the manufacture of candy sticks from thin strip material, means for stressing successive sections of the material to initiate convolution of the sections, means continuing the convolution of the sections to form loosely convoluted rolls, means compacting said rolls and bonding their convolutions to form permanently set rolls each long enough to form a plurality of candy sticks, and a cutter severing the formed rolls into candy sticks of predetermined lengths while the rolls are still maintained in their compacted and bonded condition.

3. In a method of forming small diameter rod-like bodies by rolling up flat strips around their longer edges, simultaneously pressing the strips into curved formation and sharply folding or crimping the strips along a plurality of parallel lines, releasing the pressed strips from the crimping zone to permit the crimping to be effective to initiate the convoluting of the strips by forming loops, immediately subjecting the loops to the pressure and movement of a convoluting action wherein one side of each loop is moved relative to the other and the strips rolled up to produce loosely convoluted rolls, momentarily reducing the pressure of the convoluting action to permit said rolls to expand and change their ovate shape to a cross section more nearly circular, then continuing pressure and movement of the roll convolution until the rolls are compacted into small diameter rod-like bodies, and cutting each of said rod-like bodies into a plurality of sticks while they are still subject to the pressure of the convoluting and compacting action.

4. In apparatus for the manufacture of candy sticks from paper, a crimper roll having a plurality of sharp longitudinal ribs, a co-acting presser roll acting as a friction gear to rotate the crimper roll, means providing a resilient covering for the co-acting roll, means holding the co-acting roll pressed against the crimper roll, means including constantly rotating elements for cutting paper into strips and for feeding the strips to said crimper roll, the strips being acted upon by said rolls so that they will have an inherent tendency to curl after release from the crimper, stripper means co-acting with the crimper roll to remove the formed strips therefrom means for rolling up and compacting the curled strips into substantially solid master sticks, and means cutting each of the master sticks into a plurality of component candy sticks while substantially continuing said compacting action.

5. In a machine for the manufacture of small diameter rod-like candy sticks by rolling up paper strips, a rotatable toothed crimper, means co-acting with said crimper to cause paper strips to be formed around said crimper to give the strips a tendency to curl up when released therefrom, said mans involving a resilient roller intergeared with the crimper by indentation of the crimper teeth means acting upon the leading parts of the strips on said crimper for removing them from the crimper and allowing them to assume curled up condition, means for acting upon the curled up strips to further convolute and compact them into substantially solid and permanently set rod-like master sticks, and a master stick cutter severing each master stick into a plurality of candy sticks while maintaining said compacting action.

6. In a machine for forming candy sticks by rolling up paper strips into small diameter rod-like bodies, a rotatable toothed crimper, means co-acting with the crimper to give the strips a curling up tendency, said means involving a resilient roller intergeared with the crimper by indentation of the crimper teeth a stripper acting upon the formed strips to release them from the crimper, a convoluter acting upon the released strips to form loosely wound paper rolls, means for compacting the loosely wound rolls, means for bonding the compacted rolls to form permanently set rod-like master sticks, and means for cutting the master sticks into candy sticks of predetermined lengths while they are still subject to the action of the bonding means.

7. In a method of forming candy sticks, simultaneously pressing paper strips into curvilinear form and crimping or sharply indenting them along parallel lines to cause them to have a convoluting tendency when released from said pressing action, releasing the strips from the pressing and indenting zone, then rolling up and compacting the crimped strips until substantially solid rod-like master sticks are formed, bonding adjacent convolutions of the master sticks while continuing said compacting action, and severing each master stick into a plurality of candy sticks while the bonding and compacting actions are substantially continued.

8. In a candy stick machine, paper feeding mechanism, a continuously rotating strip cutter acting upon the paper to cut it into master strips, means including a crimper forming the strips into loosely convoluted paper rolls, a compacter including an endless belt, means including the endless belt for driving the cutter and the feeding mechanism, and means operatively disposed between the belt and the cutter for automatically interrupting the operative connection between the cutter and belt whenever the cutter fails to operate properly and the paper fails to pass to the crimper roll in successive strips.

9. In a machine for forming rolled up rods of paper or other suitable sheet material, means for crimping or indenting sheet material strips on one side to give them a curling up tendency, a stripper releasing the indented strips from said means, a convoluter forming the released strips into loosely wound rolls, means receiving the loosely wound rolls from the convoluter and forming them into tightly wound and substantially solid rod-like, master sticks, said last named means rotating the rolls to advance them through compacting and bonding zones, and a master stick cutter having knives against and along which the master sticks are rolled while the compacting action is substantially maintained.

10. In a machine for forming small diameter rod-like elements by rolling up flat strip material, means for mounting a supply roll from which the material is continuously unwound, a strip cutting mechanism including co-acting rolls continuously rotating in opposite directions with the material continuously passing between them, means causing one of the co-acting rolls to advance the material from the supply roll at the speed of the roll, a crimper including contacting rolls which grip said material beyond the cutting mechanism and cause it to be fed therefrom, the cutting mechanism acting to sever the material to form a master strip after the leading edge of the strip has been gripped by said contacting rolls, a combined convoluter and compacter including an endless belt which receives the strips from the crimper and rolls them up under pressure to form permanently set rod-like master sticks, driving mechanism including said endless belt for transmitting power to the crimper and the strip cutting mechanism, automatic means for interrupting the driving connection between the endless belt and the cutting mechanism, said automatic means functioning from a predetermined condition of advance of the material through the machine.

11. In a machine for forming convoluted sticks from rolled up paper or other sheet material, a feeding mechanism for sheet material, strip cutting mechanism, a crimper mechanism, a convoluter, a compacter, and means co-operating with said mechanisms to cause the sheet material to be continuously unwound from a supply roll and to continuously advance through said mechanisms, the convoluter receiving from the crimper the strips which are severed by the cutting mechanism.

12. In the manufacture of convoluted rod-like elements from thin strip material, means for crimping successive sections of the material to initiate convolution of the sections, means continuing the convolution of the sections under pressure to form loosely convoluted rolls, means compacting said rolls and bonding their convolutions to form master rolls each long enough to provide a plurality of convoluted rod-like elements, a cutter severing the master rolls into components of predetermined lengths while they are still being acted upon by the bonding means, and means acting on the rolls to insure their approach to the cutter at an angle of the order of 90° to lines of the cuts.

13. In apparatus for the manufacture of dowel-like elements from rolled up paper or other suitable sheet material, means for rotatably supporting a supply roll from which a master strip of the sheet material normally runs continuously to the apparatus, a strip cutter including constantly rotating elements for cutting the master strip into uniform stick strips as the master strip passes continuously between said elements, a curling device by which the sheet material is gripped before it is severed by said cutter, a convoluter acting upon the curled strips to form them into loosely wound rolls, and means for continuing the convolution of the rolls to compact them and form them into substantially solid sticks with their convolutions permanently bonded.

14. In a machine of the class described; a convoluter forming loosely wound rolls of paper or other suitable sheet material; the convoluter including a constantly driven endless carrier; a pressure plate structure having a pressure applying surface normally so fixed with reference to a co-acting surface of the carrier that there is formed a passageway at least a part of which is tapered, said rolls being compacted as they are rotated and advanced in the passageway by the movement of the co-acting surface of the carrier; means for applying a bonding agent to the carrier which in turn applies it to the rolls which are being compacted; means for momentarily relieving the compacting pressure on the rolls so that they will assume a more nearly round cross-section and then further compacting them; stick cutting means including fixed cutter elements supported by the pressure plate structure and projecting into said passageway so that the compacted rolls are rolled over said elements by the action of the carrier; and straightening means acting upon the rolls to straighten them and bring their axes into planes normal to the direction of the movement of the co-acting surface of the carrier before the rolls contact with the stick cutter elements; said straightening means including a releasable passageway barrier contacted by a compacted roll to cause the latter to be straightened and aligned, and means in advance of the barrier and contactable by an oncoming roll to cause the barrier to release the straightened roll and then immediately return to its stranghtening position in order that it may engage an oncoming roll.

15. In a machine for manufacturing rod-like elements from flat strip material; means for convoluting sections of the material to form loosely convoluted rolls; and means for further rolling-up and compacting said rolls to form permanently set elements; said last named means including a bed-plate construction, an endless belt with its upper run passing over and in contact with the upper surface of the bed-plate, a pressure plate structure normally held fixed in spaced relation to the upper run of the belt, fixed cutter knives carried by the pressure plate structure near one end thereof, means for pivotally mounting the pressure plate structure at one side of the belt, and locking means acting upon the side of said structure opposite its pivots to normally hold said structure so that its lower surface is in properly spaced relation to the upper surface of the upper run of the belt, said last named means being quickly releasable so that the pressure plate structure may be swung upwardly so as to permit access to the knives as well as the belt and the lower surface of said structure.

16. In a machine for making small diameter rod-like elements from flat strip material, a convoluter for forming loosely convoluted rolls of said material, a compacter including an endless belt and a pressure plate structure between which said rolls are moved, an electric motor for driving said belt to cause such movement of the rolls, and means controlled by the speed of the belt for breaking the power circuit to the motor and stopping the machine when said rolls cause abnormal resistance to the movement of the belt.

17. In a method of forming small diameter rod-like elements by rolling up sections of flat material to form loosely convoluted rolls, subjecting the rolls to the pressure and movement of a succession of primary convoluting and compacting actions wherein pressure is exerted on the rolls and simultaneously one side of each roll is moved relative to the other to increase the number of convolutions in the roll, momentarily reducing the pressure of the convoluting and compacting action and permitting the rolls to change their ovate shape to a cross section more nearly circular after each of said primary convoluting and compacting actions, and then continuously subjecting the rolls to the pressure and relative movement of a final convoluting and bonding action until the rolls are caused to take on a permanent set and are compacted into small diameter rod-like bodies.

18. In apparatus for forming small diameter convoluted rod-like elements, an endless carrier having an exterior absorptive stratum, means applying a bonding fluid to said stratum, convoluting means co-operating with the carrier at one position to roll up sections of flat strip material to form loosely convoluted tubes or tubular rolls, and pressure surface means co-acting with the carrier to cause the loosely wound rolls to be compacted and bonded into substantially solid rod-like elements, said pressure surface means further co-acting with said carrier to make the rolling and compacting pressure great enough during the bonding action to cause the bonding fluid to exude from said stratum for application to the said rod-like elements.

19. A machine of the class described comprising, in combination, a crimper roll, means co-acting with said roll to cause strips of paper or other suitable sheet material to be formed about the roll, means acting upon the formed strips to successively release them from the roll, means acting upon the released strips to promote their curling up tendency resulting from said forming action and to develop loosely convoluted rolls, and means for compacting the latter to form permanently set rod-like elements.

20. In apparatus for the manufacture of small diameter rod-like elements from convoluted sheet material, a crimper roll having a plurality of sharp longitudinal ribs, a co-acting presser roll acting as a friction gear to rotate the crimper roll, means providing a resilient covering for the co-acting roll, means holding the co-acting roll pressed against the crimper roll, means for feeding strips of paper or other suitable sheet material to said rolls, the strips being acted upon by said rolls so that they will have an inherent tendency to curl after release from the crimper, means acting upon the leading parts of the formed strips to remove them from the crimper roll, and means for rolling up the curled strips into compact rod-like bodies.

21. In a machine for forming small diameter rod-like elements from convoluted sheet material, means for crimping or indenting sheet material strips on one side to give them a curling up tendency, a stripper releasing the indented strips from said means, a convoluter, and means receiving loosely wound rolls from the convoluter and forming them into tightly wound and substantially solid rod-like bodies.

22. In a machine for manufacturing rod-like elements from flat strip material; means for convoluting sections of the material to form loosely convoluted rolls; and means for further rolling up and compacting said rolls to form permanently set elements; said last named means including a bed-plate construction, an endless belt with its upper run passing over and in contact with the upper surface of the bed-plate construction, a pressure plate structure normally held fixed in spaced relation to the upper run of the belt to form a roll compacting passageway, a cutter head including fixed cutter knives associated with the pressure plate structure near one end thereof and mounted in such spaced relationship to the top of the belt that there is formed a continuation of said passageway, said knives extending into the passageway continuation, means movably mounting the pressure plate structure in its spaced relation to the belt, and locking means acting upon said structure to normally hold the latter so that its lower surface is in properly spaced relation to the upper surface of the upper run of the belt, said last named means being quickly releasable so that the pressure plate structure may be moved upwardly so as to permit access to the knives and the lower surface of said structure.

23. In a machine for manufacturing rod-like elements from flat strip material; means for convoluting sections of the material to form loosely convoluted rolls; and means for further rolling up and compacting said rolls to form permanently set elements; said last named means including a bed-plate construction, an endless belt with its upper run passing over and in contact with the upper surface of the bed-plate construction, a pressure plate structure normally held fixed in spaced relation to the upper run of the belt to form a compacting passageway, a cutter head including fixed cutter knives carried by the pressure plate structure and mounted in such spaced relationship to the top of the belt that there is formed a continuation of the passageway, said knives extending into the passageway continuation, means for movably mounting the pressure plate structure in its spaced relation to the belt, and locking means acting upon the pressure plate structure to normally so hold the structure that its lower surface is in properly spaced relation to the upper surface of the upper run of the belt, said last named means being quickly releasable so that the pressure plate structure may be moved upwardly so as to permit access to the knives and the lower surface of said structure.

HIRAM A. PERKINS.